United States Patent
Jeong et al.

(10) Patent No.: US 12,213,234 B2
(45) Date of Patent: Jan. 28, 2025

(54) INDUCTION HEATING APPARATUS AND METHOD FOR CONTROLLING SAME

(71) Applicant: LG ELECTRONICS INC., Seoul (KR)

(72) Inventors: Sihoon Jeong, Seoul (KR); Kyelyong Kang, Seoul (KR); Hanna Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 778 days.

(21) Appl. No.: 17/313,500

(22) Filed: May 6, 2021

(65) Prior Publication Data
US 2021/0352775 A1 Nov. 11, 2021

(30) Foreign Application Priority Data

May 6, 2020 (KR) .......................... 10-2020-0054013

(51) Int. Cl.
*H05B 6/06* (2006.01)
*H02M 7/5387* (2007.01)
(Continued)

(52) U.S. Cl.
CPC ........ *H05B 6/065* (2013.01); *H02M 7/53871* (2013.01); *H05B 6/08* (2013.01); *H05B 6/1272* (2013.01)

(58) Field of Classification Search
CPC ........ H05B 6/065; H05B 6/08; H05B 6/1272; H02M 7/53871
(Continued)

(56) References Cited

U.S. PATENT DOCUMENTS 3,814,888 A * 6/1974 Bowers ................... F24C 7/087
363/136
6,282,102 B1 * 8/2001 Minamisawa ..... H03K 17/6877
363/16
(Continued)

FOREIGN PATENT DOCUMENTS

| EP | 3618568 | 3/2020 |
| JP | 2011-150799 | 8/2011 |

(Continued)

OTHER PUBLICATIONS

European Search Report dated Oct. 1, 2021 issued in Application No. 21172584.1.

(Continued)

*Primary Examiner* — Eric S Stapleton
*Assistant Examiner* — Yeong Juen Thong
(74) *Attorney, Agent, or Firm* — KED & ASSOCIATES, LLP

(57) ABSTRACT

An induction heating apparatus may include first/second working coils, first/second inverter circuits, and a controller. When a user changes a required power value of a first working coil or a second working coil to a third required power value, a controller determines a third driving frequency corresponding to the third required power value. The controller calculates a difference value between a driving frequency of the working coil, the required power value of which is not changed, and the third driving frequency, and compares the calculated difference value with a first reference range. When the calculated difference value is included in the first reference range, the controller changes an operation mode of a first inverter circuit from a full bridge mode to a frequency doubler mode, and changes an output power value of the working coil, the required power value of which is changed to the third required power value.

18 Claims, 13 Drawing Sheets

(51) Int. Cl.
*H05B 6/08* (2006.01)
*H05B 6/12* (2006.01)

(58) Field of Classification Search
USPC .......................................... 219/624, 620, 625
See application file for complete search history.

(56) References Cited

U.S. PATENT DOCUMENTS

| | | | |
|---|---|---|---|
| 2010/0303263 A1* | 12/2010 | Hiensch | H04R 19/02 |
| | | | 381/191 |
| 2020/0077471 A1 | 3/2020 | Park et al. | |
| 2020/0323044 A1 | 10/2020 | Kang et al. | |
| 2021/0337636 A1 | 10/2021 | Park et al. | |
| 2021/0352774 A1 | 11/2021 | Choi et al. | |

FOREIGN PATENT DOCUMENTS

| | | | |
|---|---|---|---|
| JP | 2012226900 A | * | 4/2012 |
| JP | 2012-226900 | | 11/2012 |
| JP | 2016-058176 | | 4/2016 |
| KR | 10-2017-0075913 | | 7/2017 |
| KR | 10-2019-0040843 A | | 4/2019 |
| KR | 10-2020-0043624 | | 4/2020 |
| WO | WO 2019/074246 | | 4/2019 |
| WO | WO 2020/046048 | | 3/2020 |

OTHER PUBLICATIONS

International Search Report dated Aug. 26, 2021 issued in Application No. PCT/KR2021/005648.

\* cited by examiner

# INDUCTION HEATING APPARATUS AND METHOD FOR CONTROLLING SAME

CROSS-REFERENCE TO RELATED APPLICATION

This application claims priority to and the benefit of Korean Patent Application No. 10-2020-0054013, filed in Korea on May 6, 2020, the disclosure of which is incorporated herein by reference in its entirety.

BACKGROUND

1. Field

Disclosed herein are an induction heating apparatus and a method of controlling the same.

2. Background

Induction heating apparatuses are devices that generate eddy current in a metallic container and heat the container using a magnetic field generated around a working coil. When an induction heating apparatus is driven, high-frequency current is supplied to the working coil. An induction magnetic field is then generated around the working coil disposed in the induction heating apparatus. When a magnetic line of force of the induction magnetic field passes through a bottom of the metallic container over the working coil, eddy current is generated inside the bottom of the container. Accordingly, the eddy current flows in the container, and the container itself is heated.

The induction heating apparatus includes two or more heating zones and two or more working coils corresponding to the two or more heating zones. For example, when a user places containers respectively in two heating zones and inputs heating initiation instructions, each of the working coils is driven at a driving frequency corresponding to a required power value set by the user.

FIG. 1 is a graph showing curves of resonance characteristics of two working coils respectively when an induction heating apparatus including the two working coils is driven. FIG. 1 shows a curve of a resonance characteristic of each of the working coils (i.e., a curve 31 of a resonance characteristic of a first working coil and a curve 32 of a resonance characteristic of a second working coil) when the two working coils are respectively driven in a state in which a container is placed in each of the heating zones of the induction heating apparatus. A resonance frequency of the first working coil is fr1, and a resonance frequency of the second working coil is fr2.

In FIG. 1, a first required power value of the first working coil is P1, and a required power value of the second working coil is P2. Accordingly, the first working coil is driven at a first driving frequency f1 corresponding to the first required power value P1, and the second working coil is driven at a second driving frequency f2 corresponding to the second required power value P2.

When the two working coils are driven at the same time as shown in FIG. 1, interference noise may be generated due to the driving of the working coils when a difference value f2−f1 between the driving frequencies of the working coils is in an audible frequency band (e.g., 2 kHz to 20 kHz). The interference noise may cause inconvenience to a user and cause a user to wonder if the induction heating apparatus is out of order.

In disadvantageous arrangements, a driving frequency of at least one of the two working coils is randomly adjusted such that the difference value f2−f1 between the driving frequencies of the working coils is out of the audible frequency band. However, when the driving frequency of the working coil is randomly adjusted to reduce the interference noise, an output power value of the working coil does not match a required power value set by a user.

BRIEF DESCRIPTION OF THE DRAWINGS

Arrangements and embodiments may be described in detail with reference to the following drawings in which like reference numerals refer to like elements, and wherein.

DETAILED DESCRIPTION

Figure 1:
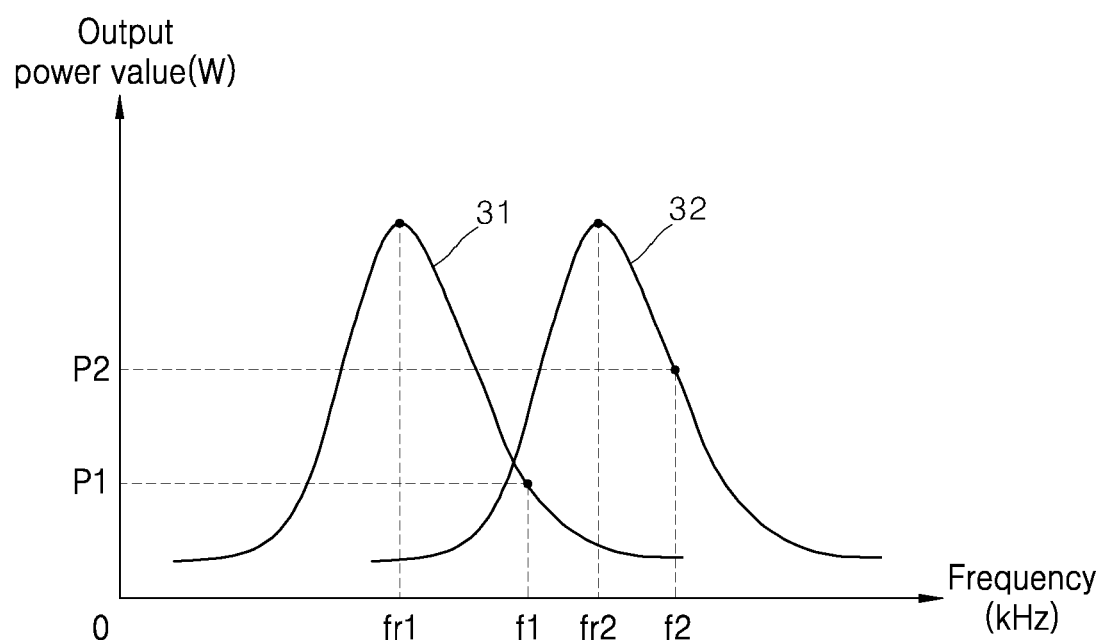
FIG. 1 is a graph showing curves of resonance characteristics of two working coils respectively when an induction heating apparatus including the two working coils is driven.

Aspects, features and advantages are specifically described hereunder with reference to the accompanying drawings such that one having ordinary skill in the art to which the present disclosure pertains can easily implement the technical spirit of the disclosure. In the disclosure, detailed description of known technologies in relation to the disclosure is omitted if it is deemed to make the gist of the disclosure unnecessarily vague. Preferred embodiments according to the disclosure are specifically described with reference to the accompanying drawings. In the drawings, identical reference numerals may denote identical or similar components.

Figure 2:
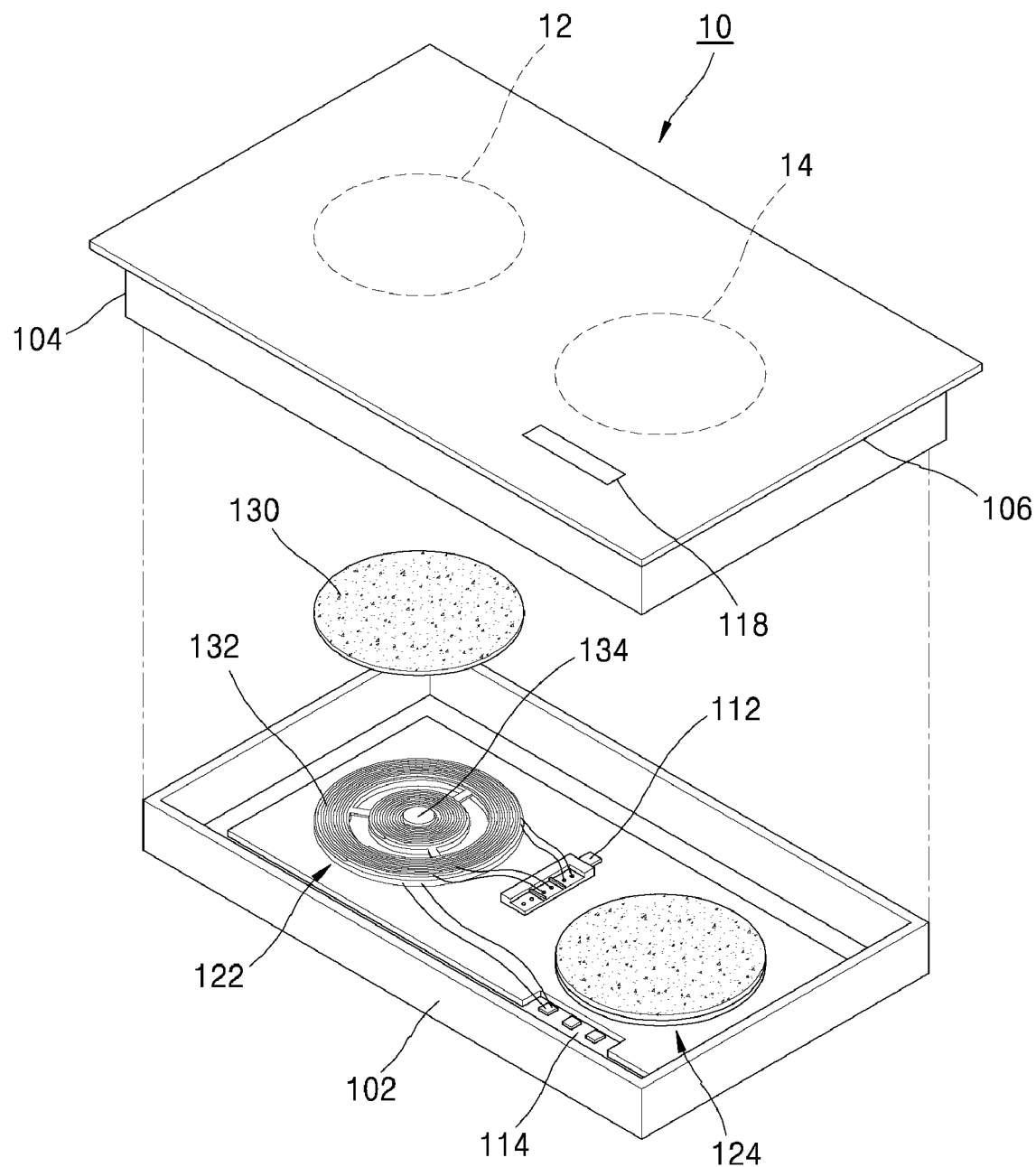
FIG. 2 is an exploded perspective view showing an induction heating apparatus according to one example embodiment.

FIG. 2 is an exploded perspective view showing an induction heating apparatus according to one example embodiment. Other embodiments and configurations may also be provided.

An induction heating apparatus 10 according to one example embodiment may include a case 102 constituting a main body, and a cover plate 104 coupled to the case 102 and configured to seal the case 102. The cover plate 104 may be coupled to an upper surface of the case 102 and may seal a space, formed in the case 102, from the outside. The cover plate 104 may include an upper plate 106 on which a container for cooking food is placed. In one example embodiment, the upper plate 106 may be made of tempered glass such as ceramic glass, but a material of the upper plate 106 may vary depending on embodiments.

Heating zones 12, 14 respectively corresponding to working coil assemblies 122, 124 may be formed on the upper plate 106. For a user to clearly recognize positions of the heating zones 12, 14, lines or figures corresponding to the heating zones 12, 14 may be printed or displayed on the upper plate 106.

The case 102 may have a hexahedron shape in which an upper portion is open. The working coil assemblies 122, 124 for heating a container may be arranged in the space formed in the case 102. Additionally, an interface 114 may be arranged in the case 102, may allow a user to supply power or to adjust a power level of each heating zone 12, 14, and may display information in relation to the induction heating apparatus 10. The interface 114 may be implemented as a touch panel that makes it possible to input information and to display information as a result of a touch. However, an interface 114 having a different structure may be used depending on the embodiment.

The upper plate 106 may have a manipulation zone 118 at a position corresponding to a position of the interface 114. For a user's manipulation, letters or images and the like may be previously printed in the manipulation zone 118. The user may perform manipulation desired by the user by touching a specific point of the manipulation zone 118 with reference to the letters or images previously printed in the manipulation zone 118. Information output by the interface 114 may be displayed though the manipulation zone 118.

The user may set a power level of each heating zone 12, 14 through the interface 114. The power level may be displayed on the manipulation zone 118 as numbers (e.g., 1, 2, 3, . . . , 9). When a power level of each heating zone 12, 14 is set, a required power value and a driving frequency of a working coil corresponding to each heating zone 12, 14 may be determined. A controller may drive each working coil such that an output power value of each working coil matches the required power value set by the user, based on the determined driving frequency. A power supply 112 for supplying power to the working coil assembly 122, 124 or the interface 114 may be disposed in the space formed in the case 102.

FIG. 2 shows two working coil assemblies, (namely, a first working coil assembly 122 and a second working coil assembly 124 arranged in the case 102 as an example. However, three or more working coil assemblies may be disposed in the case 102 depending on example embodiments.

The working coil assembly 122, 124 may include a working coil that forms an induction magnetic field using high-frequency alternating current supplied by the power supply 112, and a thermal insulation sheet that protects a coil from heat generated by a container (or object). For example, and as shown in FIG. 2, the first working coil assembly 122 may include a first working coil 132 for heating a container (or object) placed in a first heating zone 12, and a first thermal insulation sheet 130. The second working coil assembly 124 may include a second working coil and a second thermal insulation sheet. Depending on the embodiment, the thermal insulation sheet may not be provided.

A temperature sensor may be disposed in a central portion of each working coil. For example, a temperature sensor 134 may be in a central portion of the first working coil 1322. The temperature sensor may measure (or determine) a temperature of a container (or object) in each heating zone. In one embodiment, the temperature sensor may be a thermistor temperature sensor having a variable resistance whose resistance value changes according to the temperature of the container, but is not limited thereto.

In one example embodiment, the temperature sensor may output sensing voltage corresponding to a temperature of a container, and the sensing voltage output from the temperature sensor may be delivered to the controller. The controller may check the temperature of the container based on magnitude of the sensing voltage output from the temperature sensor, and when the temperature of the container is a predetermined reference value or greater, the controller may perform an overheat prevention function by lowering an output power value of a working coil or by stopping driving of a working coil.

Although not shown in FIG. 2, a substrate, on which a plurality of circuits or a plurality of elements (including a controller) are mounted, may be disposed in the space formed in the case 102. The controller may perform a heating operation by driving each working coil according to the user's heating initiation instruction input through the interface 114. When the user inputs a heating termination instruction through the interface 114, the controller may finish the heating operation by stopping the driving of the working coil.

Figure 3:
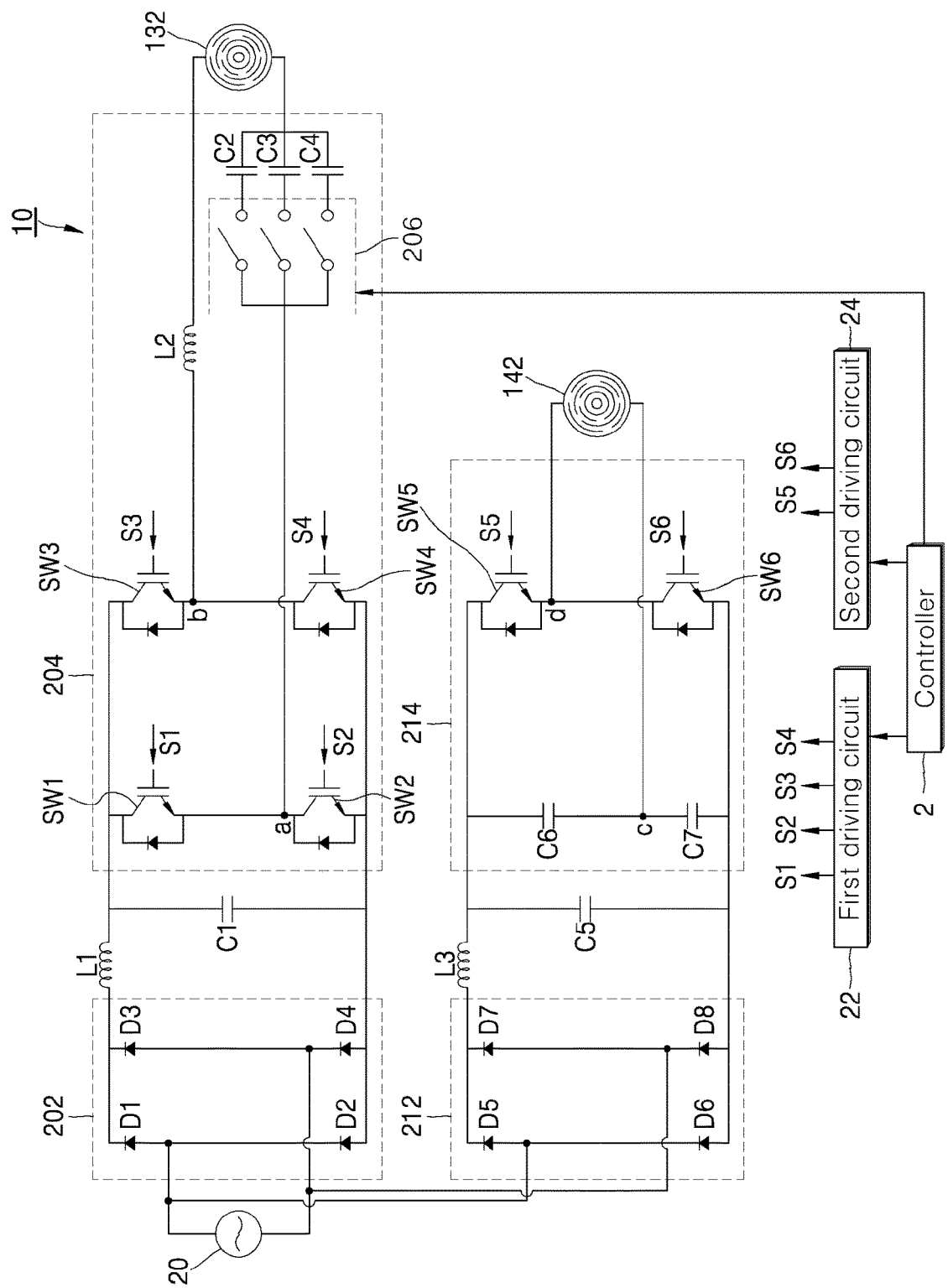
FIG. 3 is a circuit diagram of an induction heating apparatus according to one example embodiment.

FIG. 3 is a circuit diagram of an induction heating apparatus according to one example embodiment. Other embodiments and configurations may also be provided. As shown in FIG. 3, the induction heating apparatus 10 may include a first rectifier circuit 202, a first smoothing circuit L1, C1, a first inverter circuit 204, a first working coil 132, a second rectifier circuit 212, a second smoothing circuit L3, C5, a second inverter circuit 214, a second working coil 142, a first driving circuit 22, a second driving circuit 24, and a controller 2. The controller 2 may include hardware to control other components.

The first rectifier circuit 202 may include a plurality of diode elements D1, D2, D3, D4. The first rectifier circuit 202, as shown in FIG. 3, may be a bridge diode circuit, and may be a different circuit depending on the embodiment. The first rectifier circuit 202 may rectify AC input voltage supplied from a power supply device 20 to output voltage having a pulse waveform.

The first smoothing circuit L1, C1 may smooth the voltage rectified by the first rectifier circuit 202 and output DC link voltage. The first smoothing circuit L1, C1 may include a first inductor L1 and a first DC link capacitor C1.

The first inverter circuit 204 may include a first switching element SW1, a second switching element SW2, a third switching element SW3, a fourth switching element SW4, a second inductor L2, a variable capacitor(s) C2, C3, C4 (or variable capacitor device/circuit) including a plurality of capacitors, and a relay circuit 206 (or relay part). As shown in FIG. 3, the first inverter circuit 204 of the induction heating apparatus 10 may be implemented as a full bridge circuit including the four switching elements SW1, SW2, SW3, SW4.

The first switching element SW1, the second switching element SW2, the third switching element SW3, and the fourth switching element SW4 may be turned on and turned off by a first switching signal S1, a second switching signal S2, a third switching signal S3, and a fourth switching signal S4 respectively output from the first driving circuit 22. Each of the switching elements SW1, SW2, SW3, SW4 may be turned on when each of the switching signals S1, S2, S3, S4 is at a high level, and may be turned off when each of the switching signals S1, S2, S3, S4 is at a low level.

Any switching elements (among the switching elements SW1, SW2, SW3, SW4) may be turned on and turned off complementarily. For example, in any operation mode, the second switching element SW2 may be turned off (turned on) while the first switching element SW1 is turned on (turned off). In the present disclosure, the switching elements that are turned on and turned off complementarily are referred to as "mutually complementary" switching elements.

Additionally, any switching elements (among the switching elements SW1, SW2, SW3, SW4) may be turned on and turned off identically. For example, in any operation mode, the first switching element SW1 and the third switching element SW3 may be turned on and turned off at the same timing. The switching elements that are turned on and turned off at the same timing may be referred to as "mutually corresponding" switching elements.

DC link voltage input to the first inverter circuit 204 may be converted into AC voltage (AC current) as a result of turn-on and turn-off operations (i.e., switching operations) of the switching elements SW1, SW2, SW3, SW4 included in the first inverter circuit 204. The AC voltage (AC current) converted by the first inverter circuit 204 may be supplied to the second inductor L2, the first working coil 132 and the plurality of variable capacitors C2, C3, C4 (or variable capacitor circuits). When the AC voltage (AC current) is supplied by the first inverter circuit 204, resonance may occur in the first working coil 132, and thermal energy may be supplied to a container (or object).

The first switching signal S1, the second switching signal S2, the third switching signal S3 and the fourth switching signal S4 may be pulse width modulation (PWM) signals that respectively have a predetermined duty ratio.

The relay circuit 206 may include a plurality of relays (or switches) connected in series with each of the variable capacitors C2, C3, C4. Each relay included in the relay circuit 206 may be opened or closed by a control signal of the controller 2.

In the present disclosure, depending on the number of the relays that are closed as a result of control by the controller 2, an entire capacitance value of the variable capacitor(s) C2, C3, C4 (or variable capacitor circuit) may vary. That is, the controller 2 may adjust a capacitance value of the variable capacitor(s) C2, C3, C4 by opening or closing the relays included in the relay circuit 206.

In at least one example embodiment, the controller 2 may determine an operation mode of the first inverter circuit 204, and may control open/close state of each of the relays included in the relay circuit 206 such that the capacitance value of the variable capacitor(s) C2, C3, C4 corresponds to the operation mode of the first inverter circuit 204. As described below, a frequency of resonance current following in the working coil 132 may be adjusted based on the capacitance value of the variable capacitor(s) C2, C3, C4.

In the example embodiment of FIG. 3, the variable capacitor circuit may include three capacitors C2, C3, C4 connected in parallel. However, the number of the capacitors included in the variable capacitor circuit may vary depending on the embodiment. Additionally, a connection (in series or in parallel) of the capacitor included in the variable capacitor circuit may differ depending on the embodiment.

Referring to FIG. 3, the second rectifier circuit 212 may include a plurality of diode elements D5, D6, D7, D8. The second rectifier circuit 212, as shown in FIG. 3, may be a bridge diode circuit, and may be a different circuit depending on the embodiment. The second rectifier circuit 212 may rectify AC input voltage supplied from the power supply device 20 to output voltage having a pulse waveform.

The second smoothing circuit L3, C5 may smooth the voltage rectified by the second rectifier circuit 212 and output DC link voltage. The second smoothing circuit L3, C5 may include a third inductor L3 and a second DC link capacitor C5.

The second inverter circuit 214 may include a sixth capacitor C6, a seventh capacitor C7, a fifth switching element SW5, and a sixth switching element SW6. As shown in FIG. 3, the second inverter circuit 214 (of the induction heating apparatus 10) may be implemented as a full bridge circuit including the two switching elements SW5, SW6. However, in another example embodiment, the second inverter circuit 214, like the first inverter circuit 204, may also be implemented as a full bridge circuit including four switching elements.

The fifth switching element SW5 and the sixth switching element SW6 may be complementarily turned on and turned off by a fifth switching signal S5 and a sixth switching signal S6 respectively output from the second driving circuit 24.

FIG. 3 shows an IGBT element as each of the switching elements SW1, SW2, SW3, SW4, SW5, SW6. However, each of the switching elements SW1, SW2, SW3, SW4, SW5, SW6 may be a different type of switching element (e.g., a BJT or FET element and the like).

As a result of turn-on and turn-off operations (i.e., switching operations of the switching elements SW5, SW6 included in the second inverter circuit 214), DC link voltage input to the second inverter circuit 214 may be converted into AC voltage (AC current). The AC voltage (AC current) converted by the second inverter circuit 214 may be supplied to the second working coil 142. As a result of the AC voltage (AC current) by the second inverter circuit 214, resonance may occur in the second working coil 142 and thermal energy may be supplied to a container (or an object).

In the present disclosure, each of the fifth switching signal S5 and the sixth switching signal S6 may be a PWM signal having a predetermined duty ratio.

Each of the working coils 132, 142 may be driven when AC current output from each of the inverter circuits 204, 214 is supplied to each of the working coils 132, 142. As a result of driving of each of the working coils 132, 142, eddy current may flow in the container (or object) placed over each of the working coils 132, 142 and the container may be heated. Magnitude of thermal energy supplied to the container may differ depending on magnitude of power that is actually generated as a result of driving of each of the working coils 132, 142 (i.e., depending on an output power value of each of the working coils 132, 142).

The controller 2 may determine a driving frequency of each of the working coils 132, 142 such that the driving frequency corresponds to a power level of a heating zone set by the user. In one example embodiment, the controller 2 may determine a driving frequency of each of the working coils 132, 142 with reference to a table in which a driving frequency corresponding to each power level is listed or with reference to an equation of a relationship between each power level and a driving frequency. Additionally, magnitude of power (i.e., a required power value) output by each of the working coils 132, 142 may be determined based on the power level set by the user.

The controller 2 may supply each of the driving circuits 22, 44 with a control signal corresponding to the determined driving frequency. Each of the driving circuits 22, 44 may output switching signals S1, S2, S3, S4, S5, S6 having a duty ratio corresponding to the driving frequency determined by the controller 2, based on the control signal output from the controller 2.

When the induction heating apparatus 10 is powered on as a result of the user's manipulation of the interface of the induction heating apparatus 10, the induction heating apparatus 10 may get into a driving standby state as power is supplied to the induction heating apparatus from the power supply device 20. The user may then place a container (or object) over each of the working coils 132, 142 (of the induction heating apparatus 10) and set a power level for the container (or object) to input an instruction for initiating a heating process to each of the working coils 132, 142. When the user inputs the heating initiation instruction, a power value required by each of the working coils 132, 142 (i.e., a required power value) may be determined depending on the power level set by the user.

Having received the user's heating initiation instruction, the controller 2 may determine a driving frequency corresponding to the required power value of each of the working coils 132, 142, and may supply a control signal corresponding to the determined driving frequency to each of the driving circuits 22, 24. Accordingly, each of the driving circuits 22, 24 may output switching signals S1, S2, S3, S4, S5, S6, and each of the working coils 132, 142 may be driven based on the switching signals S1, S2, S3, S4, S5, S6 that are respectively input to the switching elements SW1, SW2, SW3, SW4, SW5, SW6. As a result of driving of each of the working coils 132, 142, eddy current may flow in the container (or object), and the container (or object) may be heated.

While the containers are being heated by the first working coil 132 being driven at a first driving frequency and the second working coil 142 being driven at a second driving frequency, the required power value of the first working coil 132 or the second working coil 142 may be changed by the user to a third required power value. For example, when the required power value of the first working coil 132 is changed from a first required power value (e.g., 2000 W) to a third required power value (e.g., 500 W), the controller 2 needs to change the driving frequency of the first working coil 132 to a third driving frequency corresponding to the third required power value (e.g., 500 W).

When the driving frequency of the first working coil 132 or the driving frequency of the second working coil 142 is changed to the third driving frequency (as described above), interference noise may be generated depending on a difference value between the driving frequency of the working coil, whose driving frequency is not changed, and the third driving frequency.

In one example embodiment, the controller 2 may determine the third driving frequency corresponding to the third required power value when the required power value of the first working coil 132 or the second working coil 142 is changed to the third required power value. To prevent the above-described interference noise, the controller 2 may calculate a difference value between the driving frequency of the working coil in which the required power value is not changed, and the third driving frequency. In the present disclosure, a difference value between two driving frequencies denotes a value that is calculated as a result of deduction of a small value from a large value out of the two driving frequencies.

The controller 2 may change an operation mode of the first inverter circuit 204 when the calculated difference value is included within a predetermined first reference range (e.g., a range from 5 kHz to 20 kHz). In one example embodiment, when the calculated difference value is included in the first reference range, the operation mode of the first inverter circuit 204 may be changed from a full bridge mode to a frequency doubler mode.

When the operation mode of the first inverter circuit 204 is changed to the frequency doubler mode, a resonance frequency of the first working coil 132 may be amplified by two times. Accordingly, in an entire power range of the first working coil 132 and an entire power range of the second working coil 142, the difference value between the driving frequency of the working coil (the required power value of which is not changed) and the third driving frequency may be a predetermined noise avoidance value or greater. In the present disclosure, the noise avoidance value may be set to a value (e.g., 22 kHz) greater than a maximum value (e.g., 20 kHz) among boundary values of an audible frequency band, and may be set differently depending on the embodiment.

When the operation mode of the first inverter circuit 204 is changed, the controller 2 may change an output power value of the working coil (the required power value of which is changed) to the third required power value. As a result, interference noise caused by the driving of the first working coil 132 and the second working coil 142 may be prevented.

In another example embodiment, when a difference value between a driving frequency of a working coil (the required power value of which is not changed) and the third driving frequency is included in a predetermined second reference range (e.g., from 2 kHz to 5 kHz), the controller 2 may set the driving frequency of the first working coil 132 and the driving frequency of the second working coil 142 to the same value. As a result, generation of interference noise, caused by the driving of the first working coil 132 and the second working coil 142, may be prevented.

In another example embodiment, when the difference value between the driving frequency of the working coil (the required power value of which is not changed) and the third driving frequency is not included in the first reference range and the second reference range, the controller 2 may set the driving frequency of the working coil the required power value of which is changed) to the third driving frequency and may not change the driving frequency of the working coil (the required power value of which is not changed). That is, when the difference value between the driving frequency of the working coil (the required power value of which is not changed) and the third driving frequency is not included in the first reference range and the second reference range, interference noise may be prevented.

Additionally, boundary values of the first reference range and the second reference range may be set differently depending on the embodiment.

Figure 4:
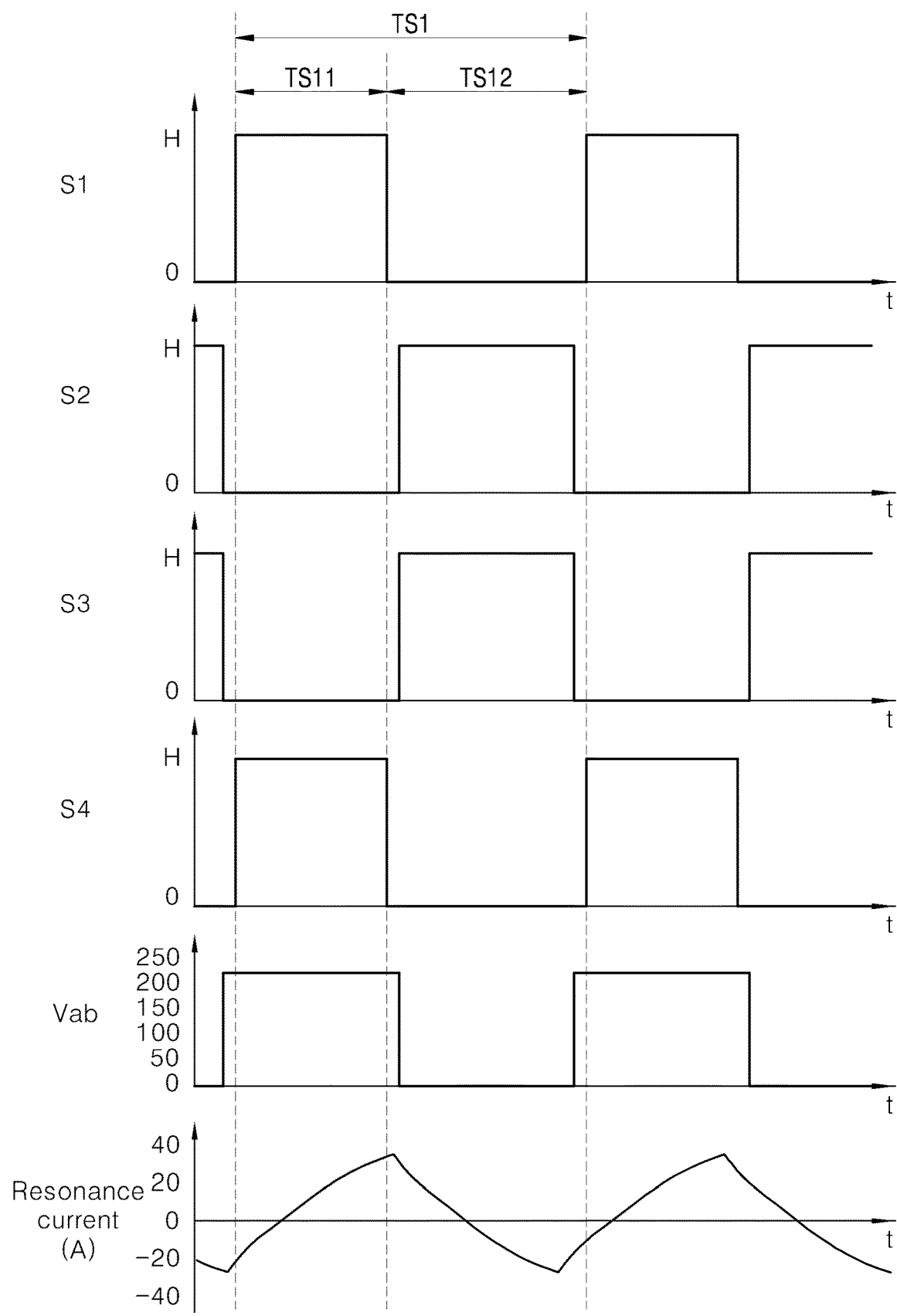
FIG. 4 shows waveforms of switching signals, input voltage and resonance current when an operation mode of a first inverter circuit is a full bridge mode, respectively, in one example embodiment.

FIG. 4 shows waveforms of switching signals, input voltage and resonance current when an operation mode of a first inverter circuit is a full bridge mode, respectively, in one example embodiment. Other embodiments and configurations may also be provided.

When the operation mode of the first inverter circuit 204 is the full bridge mode, the controller 2 may provide a control signal to the driving circuit 22 such that the driving circuit 22 outputs switching signals S1, S2, S3, S4 having waveforms illustrated in FIG. 4.

Additionally, the controller 2, as shown in FIG. 4, may set a capacitance value of the variable capacitor circuit C1, C2, C3 to Cr,f as in the following equation (Equation 1) such that resonance current supplied to the first working coil 132 is output once during a first cycle TS1 of the switching signal S1, S2, S3, S4, in other words, such that a frequency of resonance current supplied to the first working coil 132 becomes a same value as a frequency of the switching signal S1, S2, S3, S4.

$$C_{r,f} = \frac{1}{(2\pi f_{r,f})^2 L_r} \quad \text{[Equation 1]}$$

In Equation 1, fr,f is the same as the frequency of the switching signal S1, S2, S3, S4, and Lr denotes an inductance value of the second inductor L2.

The controller 2 may open or close each of the relays included in the relay circuit 206 such that an entire capacitance value of the variable capacitor circuit C1, C2, C3 (or variable comparator part) matches the capacitance value Cr,f in Equation 1. When adjustment of the capacitance value of the variable capacitor circuit C1, C2, C3 is completed, the controller 2 may supply the first inverter circuit 204 with switching signals S1, S2, S3, S4 having waveforms illustrated in FIG. 4 through the first driving circuit 22. As a result, a process of heating the container (or object) may be performed.

As illustrated in FIG. 4, each of the switching signals may have a turn-on section and a turn-off section within the first cycle TS1. In the present disclosure, time in the turn-on section is referred to as turn-on time TS11, and time in the turn-off section is referred to as turn-off time TS12. Additionally, a ratio of the turn-on time TS11 to the first cycle TS1 is referred to as a duty ratio of the switching signal. For example, under the assumption that the first cycle TS1 of the first switching signal S1 is one second and that the turn-on time TS11 is 0.5 second, the duty ratio of the first switching signal S1 is 50% (or 0.5).

Referring to FIG. 4, the first switching element SW1 and the second switching element SW2 may be complementarily turned-on and turned-off. The third switching element SW3 and the fourth switching element SW4 may be complementarily turned-on and turned-off.

FIG. 4 shows a waveform of Vab that is magnitude of voltage between a node and b node in the circuit diagram of FIG. 3. Herein, Vab is the same as an input voltage value Vin that is magnitude of input voltage input to the first working coil 132. FIG. 4 also shows a waveform of input current (i.e., resonance current) input to the first working coil 132.

When the operation mode of the first inverter circuit 204 is the full bridge mode as illustrated in FIG. 4, the input voltage Vab and the resonance current have the same frequency. Additionally, the frequencies of the input voltage Vab and the resonance current are the same as the frequency of the switching signal S1, S2, S3, S4. Accordingly, a voltage gain of the first working coil 132 may be maintained at a maximum value (e.g., 1), and power may be supplied to the container reliably.

Figure 5:
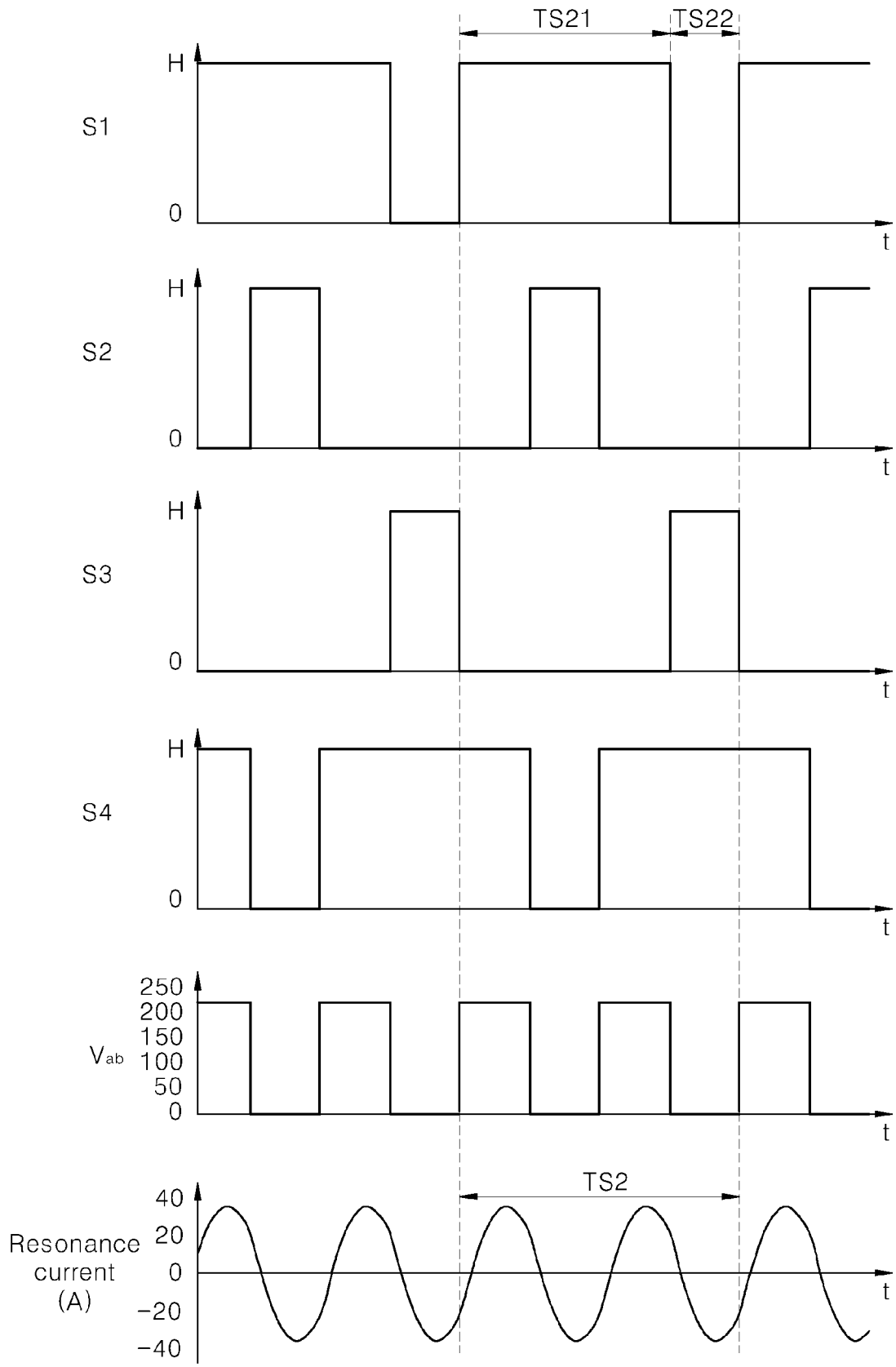
FIG. 5 shows waveforms of switching signals, input voltage, and resonance current when an operation mode of a first inverter circuit is a frequency doubler mode, respectively, in one example embodiment.

FIG. 5 shows waveforms of switching signals, input voltage, and resonance current when an operation mode of a first inverter circuit is a frequency doubler mode, respectively, in one example embodiment. Other embodiments and configurations may also be provided.

When the operation mode of the first inverter circuit 204 is determined as the frequency doubler mode, the controller 2 may supply a control signal to the first driving circuit 22 such that the first driving circuit 22 outputs switching signals S1, S2, S3, S4 having waveforms illustrated in FIG. 5.

Additionally, the controller 2, as shown in FIG. 5, may set a capacitance value of the variable capacitor circuit C1, C2, C3 to Cr,d as in the following equation (Equation 2) such that resonance current supplied to the first working coil 132 is output twice during a first cycle TS2 of the switching signal S1, S2, S3, S4, in other words, such that a frequency of resonance current supplied to the first working coil 132 becomes twice a frequency of the switching signal S1, S2, S3, S4.

$$C_{r,d} = \frac{1}{(2\pi f_{r,d})^2 L_r} \quad \text{[Equation 2]}$$

In Equation 2, fr,d denotes a twice the frequency of the switching signal S1, S2, S3, S4, and Lr denotes an inductance value of the second inductor L2.

The controller 2 may open or close each of the relays included in the relay circuit 206 such that an entire capacitance value of the variable capacitor circuit C1, C2, C3 matches the capacitance value Cr,d in Equation 2. When adjustment of the capacitance value of the variable capacitor circuit C1, C2, C3 is completed, the controller 2 may supply the first inverter circuit 204 with switching signals S1, S2, S3, S4 having waveforms illustrated in FIG. 5 through the first driving circuit 22. As a result, a process of heating the container may be performed.

Referring to FIG. 5, the first switching element SW1 and the third switching element SW3 may be complementarily turned-on and turned-off. The second switching element SW2 and the fourth switching element SW4 may be complementarily turned on and turned off.

FIG. 5 shows a waveform of Vab that is magnitude of voltage between a node and b node in the circuit diagram of FIG. 3. Herein, Vab is the same as an input voltage value Vin that is magnitude of input voltage input to the first working coil 132. FIG. 5 also shows a waveform of input current (i.e., resonance current) input to the first working coil 132.

When the operation mode of the first inverter circuit 204 is the frequency doubler mode as illustrated in FIG. 5, the input voltage Vab and the resonance current have the same frequency. Additionally, the frequencies of the input voltage Vab and the resonance current are a twice the frequency of the switching signal S1, S2, S3, S4. Accordingly, a voltage gain of the first working coil 132 may be maintained at a maximum value (e.g., 1), and power may be reliably supplied to the container. Although the resonance frequency band and the driving frequency band of the first working coil 132 are increased, a voltage gain of the first working coil 132 may be maintained at a maximum value (e.g., 1). Thus, when a container such as a non-magnetic container having low power conversion efficiency is used, an input current value Iin of the first working coil 132 may not increase and power may be reliably supplied to the container.

When the operation mode of the first inverter circuit 204 is the frequency doubler mode, the controller 2 may determine the power control mode of the first inverter circuit 204 as an asymmetric pulse width modulation mode. In the asymmetric pulse width modulation mode, the controller 2 may adjust the duty ratio of the switching signal(s) S1, S2, S3, S4 while maintaining the frequency of the switching signal(s) S1, S2, S3, S4 to adjust an output power value of the first working coil 132.

Figure 6:
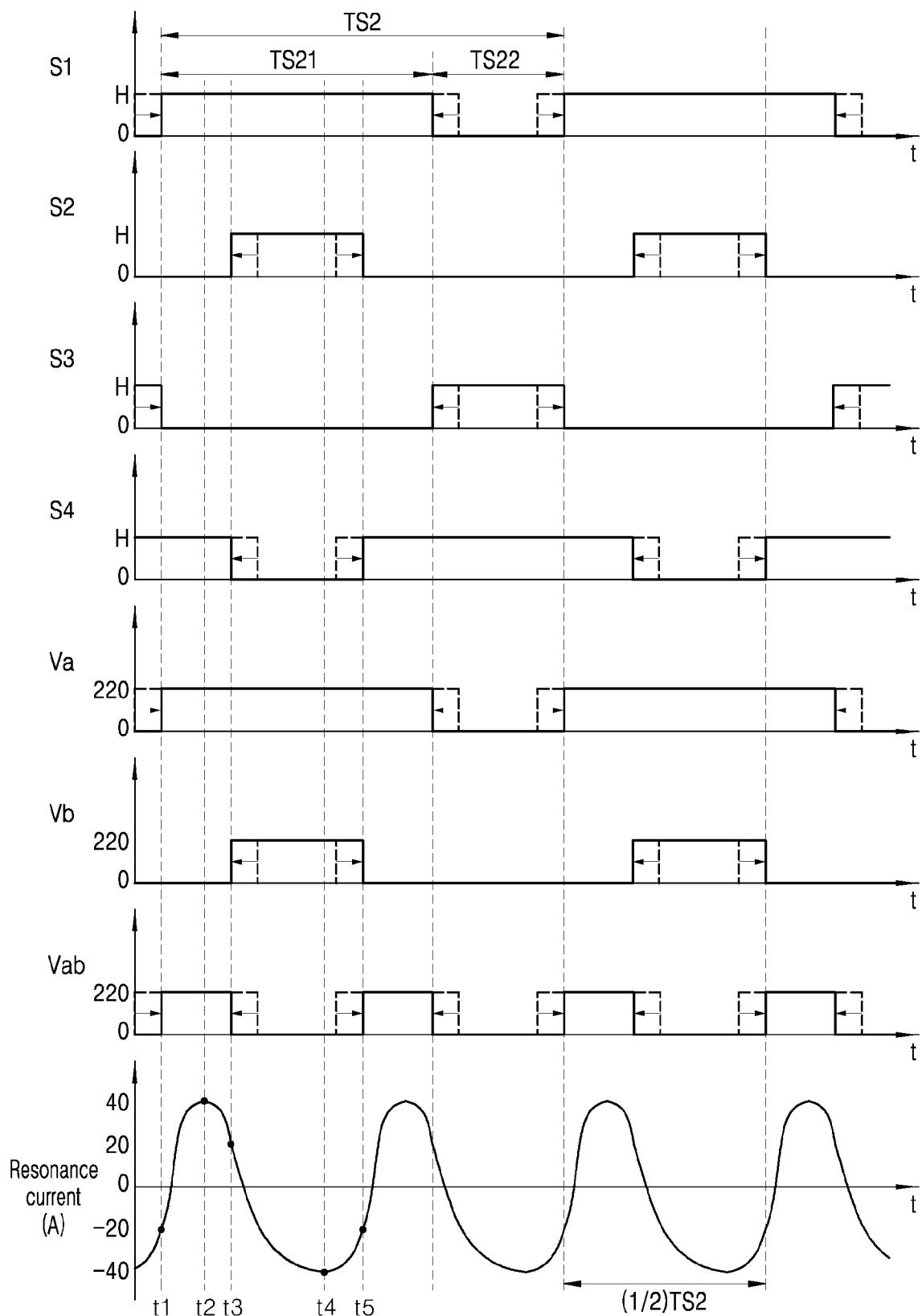
FIG. 6 shows waveforms of switching signals, input voltage, and resonance current when an operation mode of a first inverter circuit is a frequency doubler mode and a power control mode of the first inverter circuit is an asymmetric pulse width modulation mode, respectively, in one example embodiment.

FIG. 6 shows waveforms of switching signals, input voltage, and resonance current when an operation mode of a first inverter circuit is a frequency doubler mode and a power control mode of the first inverter circuit is an asymmetric pulse width modulation mode, respectively, in one example embodiment. Other embodiments and configurations may also be provided.

When the power control mode of the first inverter circuit 204 is the asymmetric pulse width modulation mode, the controller 2 may adjust the duty ratio of the switching signal(s) S1, S2, S3, S4 to adjust the output power value of the first working coil 132. As illustrated in FIG. 6, magnitude Vab of input voltage and magnitude of resonance current may respectively change depending on turn-on time TS11 of the first switching signal S1 and the third switching signal S3 (or turn-off time of the second switching signal S2 and the fourth switching signal S4), and turn-on time TS12 of the second switching signal S2 and the fourth switching signal S4 (or turn-off time of the first switching signal S1 and the third switching signal S3). Since the output power value of the first working coil 132 varies depending on the magnitude Vab of the input voltage and the magnitude of the resonance current, the controller 2 may adjust the output power value of the first working coil 132 by adjusting the turn-on time TS11 of the first switching signal S1 and the third switching signal S3 (i.e., the duty ratio of the first switching signal S1 and the third switching signal S3).

For example, the controller 2 may increase the output power value of the first working coil 132 by increasing the turn-on time TS11 of the first switching signal S1 and the third switching signal S3, in other words, by increasing the duty ratio of the first switching signal S1 and the third switching signal S3. On the contrary, the controller 2 may decrease the output power value of the first working coil 132 by decreasing the turn-on time TS11 of the first switching signal S1 and the third switching signal S3, in other words, by decreasing the duty ratio of the first switching signal S1 and the third switching signal S3.

Figure 7:
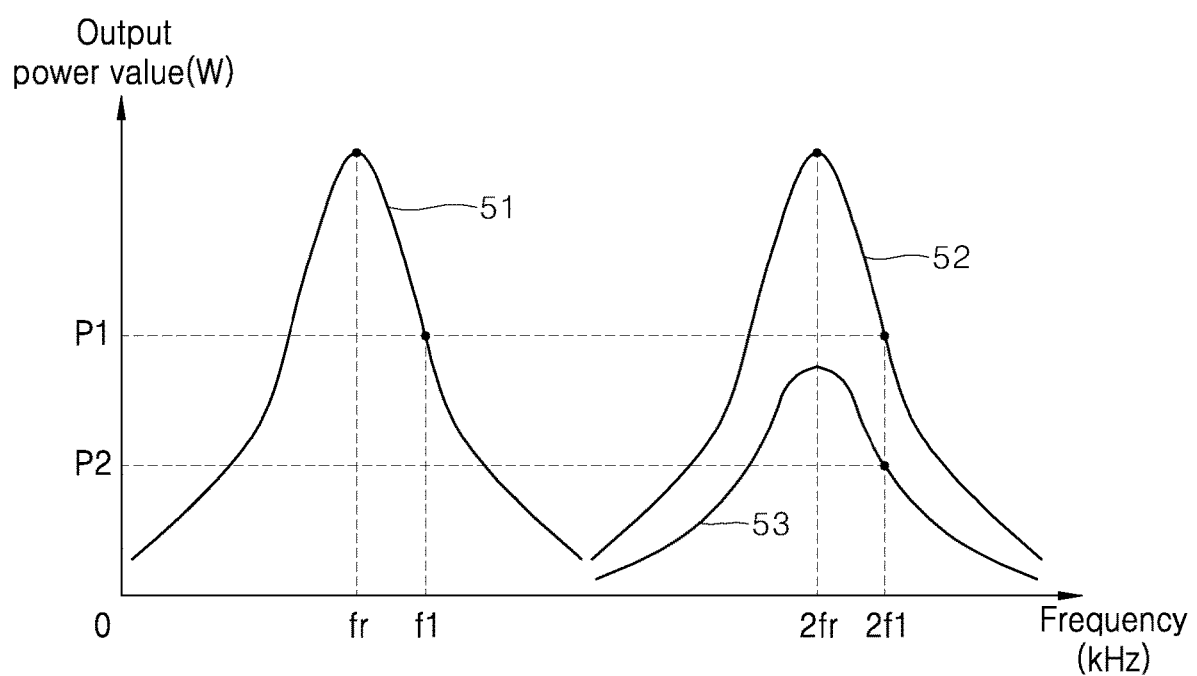
FIG. 7 is a graph showing a curve of a resonance characteristic of a working coil when an operation mode of a first inverter circuit is a frequency doubler mode, in one example embodiment.

FIG. 7 is a graph showing a curve of a resonance characteristic of a working coil when an operation mode of a first inverter circuit is a frequency doubler mode, in one example embodiment. Other embodiments and configurations may also be provided.

FIG. 7 shows a curve 51 of a resonance characteristic of the first working coil 132 in the full bridge operation mode of the first inverter circuit 204, and a curve 52 of a resonance characteristic of the first working coil 132 in the frequency doubler mode of the first inverter circuit 204, respectively.

When the controller 2 sets the operation mode of the first inverter circuit 204 to the frequency doubler mode as described above, a frequency of resonance current of the first working coil 132 may be set to twice the frequency of the switching signal(s) S1, S2, S3, S4. Accordingly, the resonance frequency of the first working coil 132 may be changed to 2×fr that is a two times of fr, as in FIG. 7.

When the resonance frequency of the first working coil 132 becomes higher as described, a driving frequency of the first working coil 132 with respect to the same output power value may also become higher. For example, in the full bridge mode, the driving frequency of the first working coil 132 needs to be set to f1 such that the first working coil 132 outputs power of P1. However, in the frequency doubler mode, the driving frequency of the first working coil 132 needs to be set to 2×f1 that is a twice f1 such that the first working coil 132 outputs the power of P1. Depending on the embodiment, the driving frequency of the first working coil 132 may not be 2×f1.

As described above, the driving frequency band of the first working coil 132 in the frequency doubler mode may be greater than in the full bridge mode. However, as described with reference to FIG. 5, the frequency of the input voltage and the frequency of the resonance current may be maintained at the same level, and the voltage gain may be set to a maximum value. Accordingly, although the driving frequency of the first working coil 132 is not set to a high frequency, the output power value of the first working coil 132 may be maintained at a high level.

FIG. 7 shows a curve 52 of a resonance characteristic of the first working coil 132 at a 50% duty ratio of the first switching signal S1 and the third switching signal S3 in the frequency doubler mode, and a curve 53 of a resonance characteristic of the first working coil 132 at a 30% duty ratio of the first switching signal S1 and the third switching signal S3 in the frequency doubler mode, respectively.

When the driving frequency of the first working coil 132 is 2×f1 in the frequency doubler mode and the duty ratios of the first switching signal S1 and the third switching signals S3 are set to 50% as illustrated in FIG. 7, the output power value of the first working coil 132 may be P1. However, when the controller 2 reduces the duty ratios of the first switching signal S1 and the third switching signals S3 from 50% to 30 while maintaining the driving frequency of the first working coil 132, the output power value of the first working coil 132 may be reduced to P2. Accordingly, the controller 2 may adjust the output power value of the first working coil 132 only by adjusting the duty ratios of the first switching signal S1 and the third switching signals S3 according to the asymmetric pulse width modulation method while maintaining the driving frequency of the first working coil 132 at the same value (e.g., 2×f1) in the frequency doubler mode.

Figure 8:
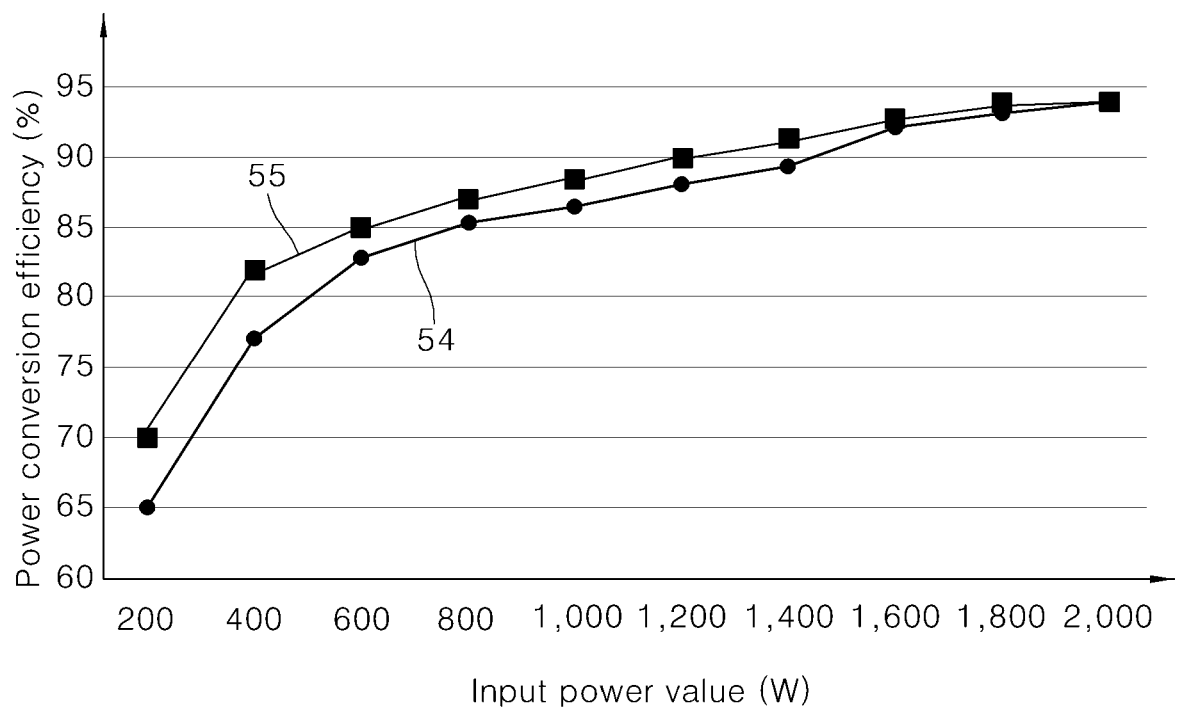
FIG. 8 is a graph showing power conversion efficiency of an induction heating apparatus when a power control mode of a first inverter circuit is set to a pulse frequency modulation mode and an asymmetric pulse width modulation mode in a state in which an operation mode of the first inverter circuit is a frequency doubler mode, respectively, in one example embodiment.

FIG. 8 is a graph showing power conversion efficiency of an induction heating apparatus when a power control mode of a first inverter circuit is set to a pulse frequency modulation mode and an asymmetric pulse width modulation mode in a state in which an operation mode of the first inverter circuit is a frequency doubler mode, respectively, in one example embodiment. Other embodiments and configurations may also be provided.

FIG. 8 shows a graph 54 of power conversion efficiency with respect to each input power value when the power control mode of the first inverter circuit 204 is the pulse frequency modulation mode, that is, when the controller 2 adjusts the driving frequency of the first working coil 132 to adjust the output power value of the first working coil 132, in the state in which the operation mode of the first inverter circuit 204 is the frequency doubler mode.

FIG. 8 also shows a graph 55 of power conversion efficiency with respect to each input power value when the power control mode of the first inverter circuit 204 is the asymmetric pulse width modulation mode, that is, when the controller 2 adjusts the duty ratio of the switching signal without changing the driving frequency of the first working coil 132 to adjust the output power value of the first working coil 132, in the state in which the operation mode of the first inverter circuit 204 is the frequency doubler mode.

In FIG. 8, the power conversion efficiency denotes a ratio of power actually delivered to a container to power input to the first working coil 132. For example, when the input power of the first working coil 132 is 1000 W and the power conversion efficiency is 80%, 800 W of power may be actually delivered to a container.

As shown in FIG. 8, across an entire range of input power values, the power conversion efficiency in the power control mode of the first inverter circuit 204 set to the asymmetric pulse width modulation mode is greater than in the power control mode of the first inverter circuit 204 set to the pulse frequency modulation mode. Accordingly, the power conversion efficiency of the working coil 132 of the induction heating apparatus in the present disclosure is increased, as compared to a working coil of an induction heating apparatus of disadvantageous arrangements, by adjusting the output power value of the first working coil 132 using the asymmetric pulse width modulation method in the state in which the operation mode of the first inverter circuit 204 is set to the half bridge mode.

In one example embodiment, when the required power value of the first working coil 214 is changed after the change in the operation mode of the first inverter circuit 204, the controller 2 may change the power control mode of the first working coil 132 to the asymmetric pulse width modulation mode.

As described above, the induction heating apparatus 10 may set the operation mode of the first inverter circuit 204 as the full bridge mode or the frequency doubler mode to heat a container (or object), thereby making it possible to heat containers (or objects) having different properties without generating interference noise.

Embodiments of a method for controlling an induction heating apparatus according to the present disclosure may be described hereunder with reference to the accompanying drawings.

Figure 9:
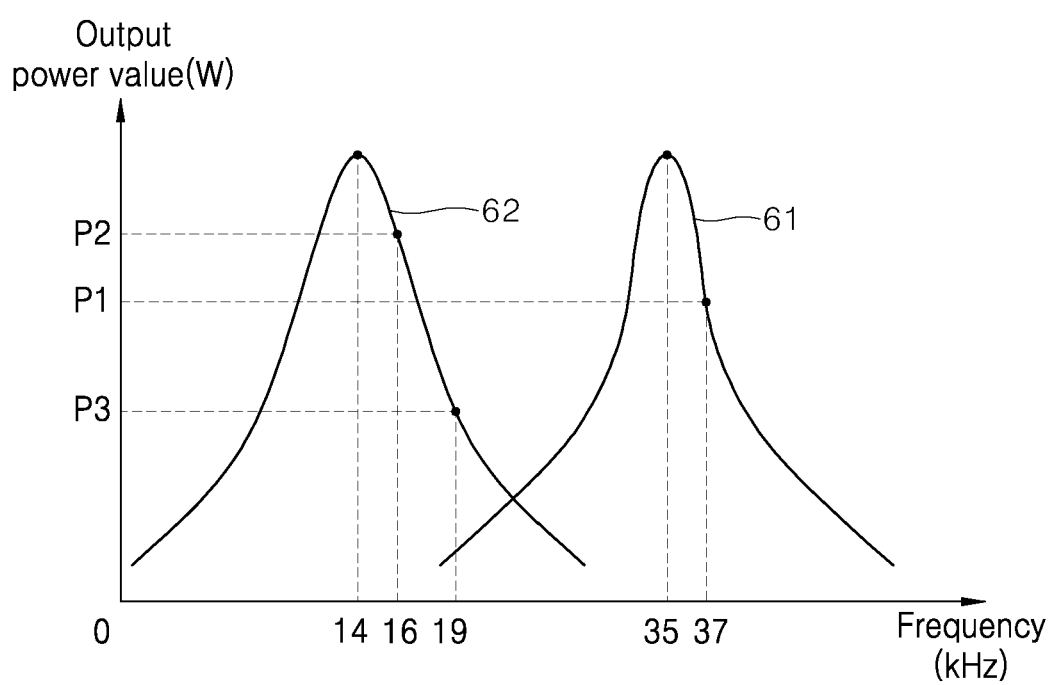
FIG. 9 is a graph showing a curve of a resonance characteristic of a first working coil and a second working coil when a required power value of the second working coil changes in a state in which a resonance frequency of the first working coil and a resonance frequency of the second working coil differ from each other, respectively, in one example embodiment.
Figure 10:
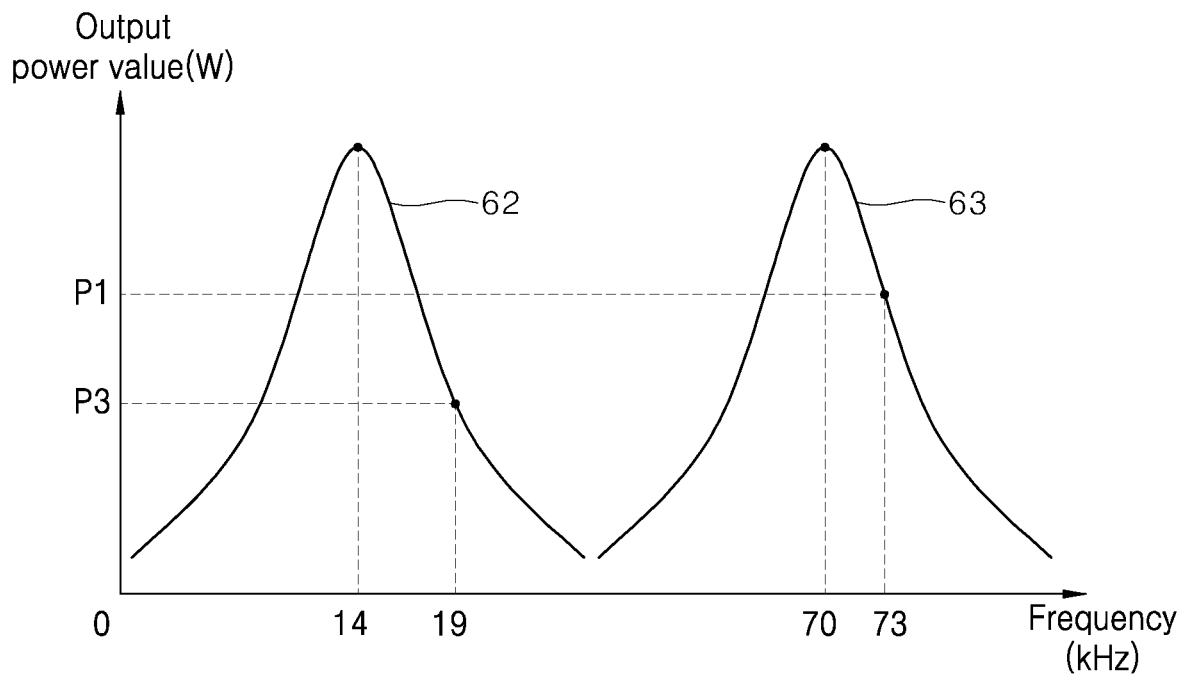
FIG. 10 is a graph showing a curve of a resonance characteristic of each of the first working coil and the second working coil when an operation mode of the first working coil is changed to a frequency doubler mode to prevent interference noise, in the example embodiment of FIG. 9.

FIG. 9 is a graph showing a curve of a resonance characteristic of a first working coil and a second working coil when a required power value of the second working coil changes in a state in which a resonance frequency of the first working coil and a resonance frequency of the second working coil differ from each other, respectively, in one example embodiment. FIG. 10 is a graph showing a curve of a resonance characteristic of each of the first working coil and the second working coil when an operation mode of the first working coil is changed to a frequency doubler mode to prevent interference noise, in the example embodiment of FIG. 9. Other embodiments and configurations may also be provided.

Referring to FIG. 9, a user may place a container (or object) in the first heating zone 12 and input a heating initiation instruction. A first required power value of the first working coil 132, corresponding to a power level of the first heating zone 12 set by the user, may be P1, and a driving frequency corresponding to the first required power value P1 may be 37 kHz. The controller 2 may then set an operation mode of a first inverter circuit 204 to a full bridge mode, set a first driving frequency of the first working coil 132 to 37 kHz and supply a control signal to the first driving circuit 22. Accordingly, the first working coil 132 may show the same resonance characteristic as that of the curve 61. The first working coil 132 may be driven at the driving frequency of 37 kHz, and an output power value of the first working coil 132 may be P1. In this example, a resonance frequency of the first working coil 132 may be 35 kH.

Additionally, the user may place a container (or object) in the second heating zone 14 and input a heating initiation instruction. A second required power value of the second working coil 142, corresponding to a power level of the second heating zone 14 set by the user, may be P2, and a driving frequency corresponding to the second required power value P2 may be 16 kHz. The controller 2 may then set a second driving frequency of the second working coil 142 to 16 kHz and supply a control signal to the second driving circuit 24. Accordingly, the second working coil 142 may show the same resonance characteristic as that of the curve 62. The second working coil 142 may be driven at the driving frequency of 16 kHz, and an output power value of the second working coil 142 may be P2. In this example, a resonance frequency of the second working coil 142 may be 14 kHz.

While the containers (or objects) are being heated as a result of driving of each of the first working coil 132 and the second working coil 142, the user may decrease the power level of the second heating zone 14. As the power level of the second heating zone 14 decreases, the required power value of the second working coil 142 may decrease from P2 to P3.

The controller 2 may determine a third driving frequency corresponding to a third required power value P3 that is a new required power value of the working coil (i.e., the second working coil 142 in which the required power value is changed). As illustrated in FIG. 9, the third frequency corresponding to the third required power value P3 may be 19 kHz.

The controller 2 may calculate a difference value between the third driving frequency of the working coil (the required power value of which is changed) and the driving frequency (the first driving frequency) of the working coil (the first working coil 132) in which the required power value is not changed. In the embodiment of FIG. 9, the difference value between the third driving frequency (19 kHz) and the first driving frequency (37 kHz) may be 18.

The controller 2 may confirm whether the calculated difference value (18) is included in a predetermined first reference range (e.g., a range from 5 kHz to 20 kHz). Since the calculated difference value (18) is included in the first reference range, the controller 2 may change the operation mode of the first inverter circuit 204 to the frequency doubler mode. Accordingly, switching signals S1, S2, S3, S4 having waveforms illustrated in FIG. 5 may be respectively input to the first inverter circuit 204.

When the first inverter circuit 204 is driven in the frequency doubler mode, a resonance frequency of the first working coil 132 may become twice an existing resonance frequency. Thus, the first working coil 132 may show a resonance characteristic that is new and the same as the resonance characteristic of the curve 63 illustrated in FIG. 10, and the resonance frequency of the first working coil 132 may be changed to 70 kHz. Additionally, the first driving frequency corresponding to the first required power value P1 of the first working coil 132 may be changed to 73 kHz.

When the first driving frequency of the first working coil 132 is changed as a result of change in the operation mode of the first inverter circuit 204, a difference value (54) between the third driving frequency (19 kHz) of the second working coil 142 and the first driving frequency (73 kHz) of the first working coil 132 is out of a second reference range. Accordingly, the controller 2 may drive the first working coil 132 at the first driving frequency (73 kHz) and drive the second working coil 142 at the third driving frequency (19 kHz). As a result, interference noise caused by the driving of the first working coil 132 and the second working coil 142 may be prevented although the output power value of the second working coil 142 is changed from P2 to P3.

When the required power value of the first working coil 132 is changed after the operation mode of the first inverter circuit 204 is changed to the frequency doubler mode as illustrated in FIG. 10, the controller 2 may change a power control mode of the first inverter circuit 204 to an asymmetric pulse width modulation mode. That is, the controller 2 may change a duty ratio of the switching signal input to the first inverter circuit 204 without changing the driving frequency of the first working coil 132 to change the output power value of the first working coil 132. In another example embodiment, the controller 2 may change the driving frequency of the first working coil 132 to change the output power value of the first working coil 132 even after the operation mode of the first inverter circuit 204 is changed to the frequency doubler mode and the required power value of the first working coil 132 is changed as illustrated in FIG. 10.

Figure 11:
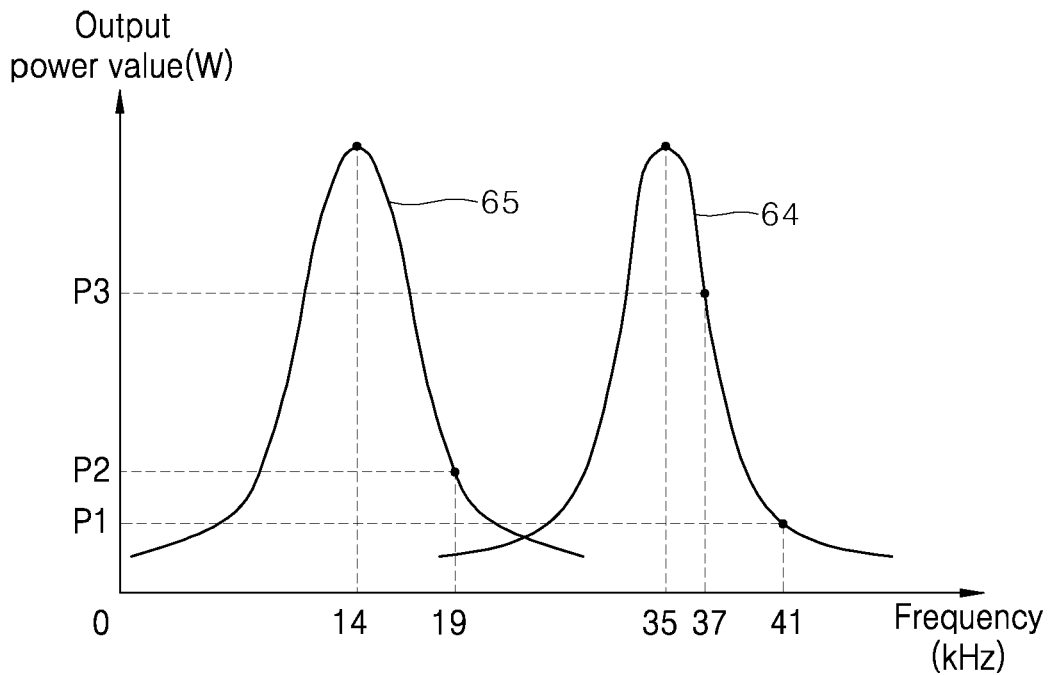
FIG. 11 is a graph showing a curve of a resonance characteristic of a first working coil and a second working coil when a required power value of the first working coil changes in a state in which a resonance frequency of the first working coil and a resonance frequency of the second working coil differ from each other, respectively, in another example embodiment.
Figure 12:
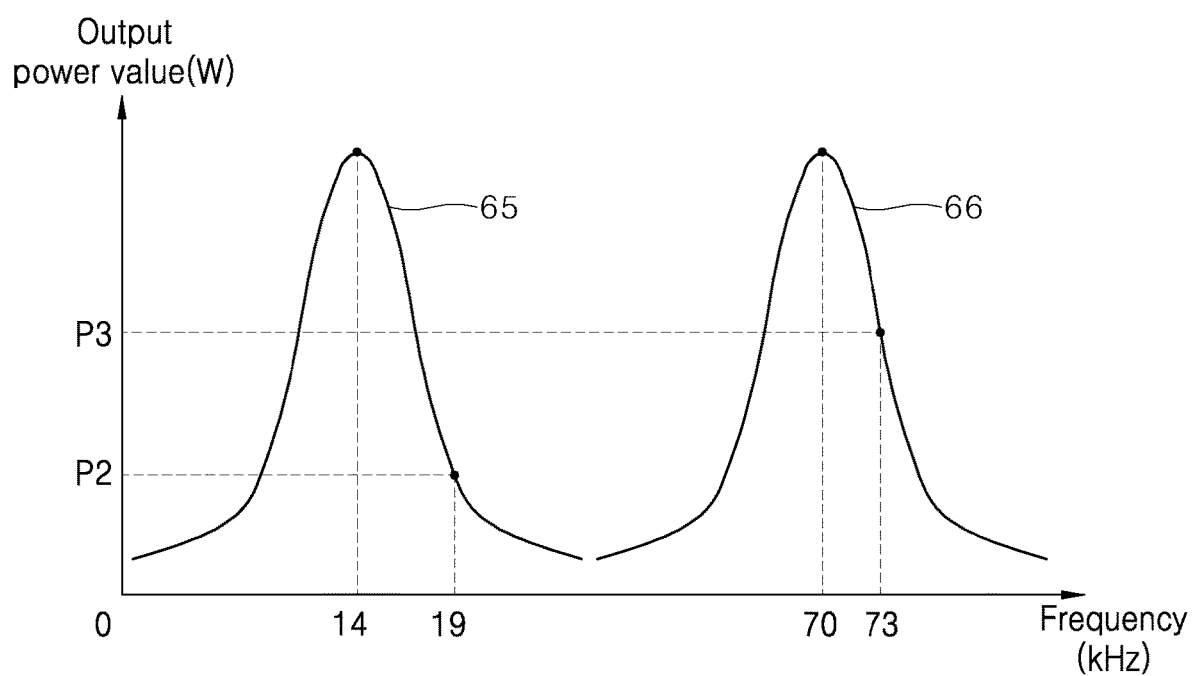
FIG. 12 is a graph showing a curve of a resonance characteristic of each of the first working coil and the second working coil when an operation mode of the first working coil is changed to a frequency doubler mode to prevent interference noise, in the example embodiment of FIG. 11.

FIG. 11 is a graph showing a curve of a resonance characteristic of a first working coil and a second working coil when a required power value of the first working coil changes in a state in which a resonance frequency of the first working coil and a resonance frequency of the second working coil differ from each other, respectively, in another example embodiment. FIG. 12 is a graph showing a curve of a resonance characteristic of each of the first working coil and the second working coil when an operation mode of the first working coil is changed to a frequency doubler mode to prevent interference noise, in the example embodiment of FIG. 11. Other embodiments and configurations may also be provided.

Referring to FIG. 11, a user may place a container (or object) in the first heating zone 12 and input a heating initiation instruction. A first required power value of the first working coil 132, corresponding to a power level of the first heating zone 12 set by the user, may be P1, and a driving frequency corresponding to the first required power value P1 may be 41 kHz. The controller 2 may then set an operation mode of the first inverter circuit 204 to the full bridge mode, set a first driving frequency of the first working coil 132 to 41 kHz and supply a control signal to the first driving circuit 22. Accordingly, the first working coil 132 may show the same resonance characteristic as that of the curve 64. The first working coil 132 may be driven at the driving frequency of 41 kHz, and an output power value of the first working coil 132 may be P1. In this example, a resonance frequency of the first working coil 132 may be 35 kHz.

Additionally, the user may place a container (or object) in the second heating zone 14 and input a heating initiation instruction. A second required power value of the second working coil 142, corresponding to a power level of the second heating zone 14 set by the user, may be P2, and a driving frequency corresponding to the second required power value P2 may be 19 kHz. The controller 2 may then set a second driving frequency of the second working coil 142 to 19 kHz and supply a control signal to the second driving circuit 24. Accordingly, the second working coil 142 may show the same resonance characteristic as that of the curve 65. The second working coil 142 may be driven at the driving frequency of 19 kHz, and an output power value of the second working coil 142 may be P2. In this example, a resonance frequency of the second working coil 142 may be 14 kHz.

While the containers are being heated as a result of driving of each of the first working coil 132 and the second working coil 142, the user may increase the power level of the first heating zone 12. As the power level of the first heating zone 12 increases, the required power value of the first working coil 132 may increase from P1 to P3.

The controller 2 may determine a third driving frequency corresponding to a third required power value P3 that is a new required power value of the working coil (i.e., the first working coil 132 in which the required power value is changed). As illustrated in FIG. 11, the third frequency corresponding to the third required power value P3 may be determined as 37 kHz.

The controller 2 may calculate a difference value between the third driving frequency of the working coil (the required power value of which is changed) and the driving frequency (the second driving frequency) of the working coil (the second working coil 142) in which the required power value is not changed. In the embodiment of FIG. 11, the difference value between the third driving frequency (37 kHz) and the second driving frequency (19 kHz) may be 18.

The controller 2 may confirm whether the calculated difference value (18) is included in a predetermined first reference range (e.g., a range from 5 kHz to 20 kHz). Since the calculated difference value (18) is included in the first reference range, the controller 2 may change the operation mode of the first inverter circuit 204 to the frequency doubler mode. Accordingly, switching signals S1, S2, S3, S4 having waveforms illustrated in FIG. 5 may be respectively input to the first inverter circuit 204.

When the first inverter circuit 204 is driven in the frequency doubler mode, a resonance frequency of the first working coil 132 may become twice an existing resonance frequency. Thus, the first working coil 132 may show a resonance characteristic that is new and the same as the resonance characteristic of the curve 66 illustrated in FIG. 12, and the resonance frequency of the first working coil 132 may be changed to 70 kHz. Additionally, the third driving frequency corresponding to the third required power value P3 of the first working coil 132 may be changed to 73 kHz.

When the third driving frequency of the first working coil 132 is changed as a result of change in the operation mode of the first inverter circuit 204, a difference value (54) between the third driving frequency (73 kHz) of the first working coil 132 and the second driving frequency (19 kHz) of the second working coil 142 is out of a second reference range. Accordingly, the controller 2 may drive the first working coil 132 at the third driving frequency (73 kHz) and drive the second working coil 142 at the second driving frequency (19 kHz). As a result, interference noise caused by the driving of the first working coil 132 and the second working coil 142 may be prevented although the output power value of the first working coil 132 is changed from P1 to P3.

When the required power value of the first working coil 132 is changed after the change in the operation mode of the first inverter circuit 204 to the frequency doubler mode as illustrated in FIG. 12, the controller 2 may change the power control mode of the first inverter circuit 204 to the asymmetric pulse width modulation mode. However, in another example embodiment, the controller 2 may change the diving frequency of the first working coil 132 to change the output power value of the first working coil 132 even after the operation mode of the first inverter circuit 204 is changed to the frequency doubler mode and the required power value of the first working coil 132 is changed as illustrated in FIG. 10.

Figure 13:
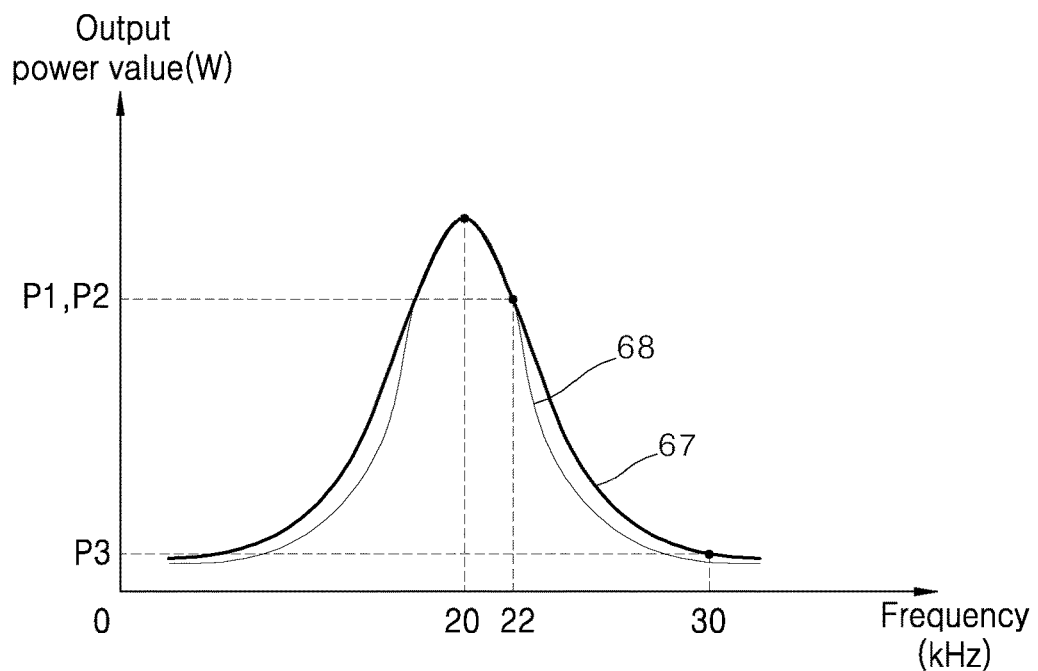
FIG. 13 is a graph showing a curve of a resonance characteristic of a first working coil and a second working coil when a required power value of the first working coil changes in a state in which a resonance frequency of the first working coil and a resonance frequency of the second working coil are the same, respectively, in yet another example embodiment.
Figure 14:
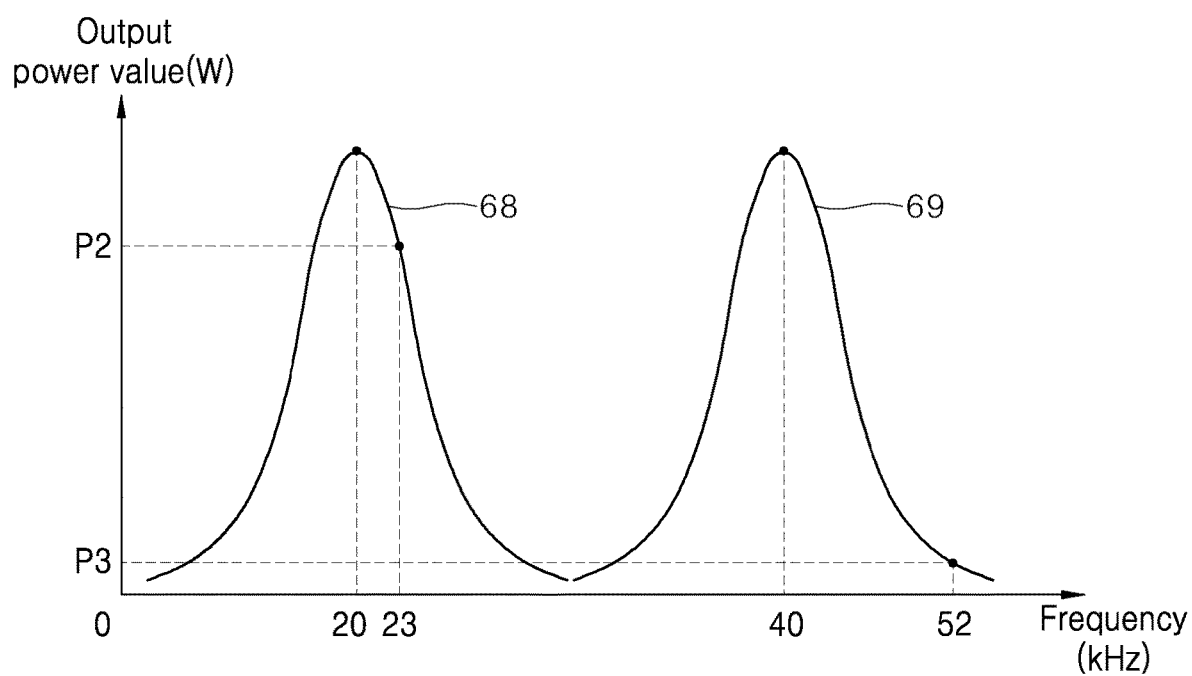
FIG. 14 is a graph showing a curve of a resonance characteristic of each of the first working coil and the second working coil when an operation mode of the first working coil is changed to a frequency doubler mode to prevent interference noise, in the example embodiment of FIG. 13.

FIG. 13 is a graph showing a curve of a resonance characteristic of a first working coil and a second working coil when a required power value of the first working coil changes in a state in which a resonance frequency of the first working coil and a resonance frequency of the second working coil are the same, respectively, in yet another example embodiment. FIG. 14 is a graph showing a curve of a resonance characteristic of each of the first working coil and the second working coil when an operation mode of the first working coil is changed to a frequency doubler mode to prevent interference noise, in the example embodiment of FIG. 13. Other embodiments and configurations may also be provided.

Referring to FIG. 13, a user may place a container (or object) in the first heating zone 12 and input a heating initiation instruction. A first required power value of the first working coil 132, corresponding to a power level of the first heating zone 12 set by the user, may be P1, and a driving frequency corresponding to the first required power value P1 may be 22 kHz. The controller 2 may then set an operation mode of the first inverter circuit 204 to the full bridge mode, set a first driving frequency of the first working coil 132 to 22 kHz and supply a control signal to the first driving circuit 22. Accordingly, the first working coil 132 may show the same resonance characteristic as that of the curve 67. The first working coil 132 may be driven at the driving frequency of 22 kHz, and an output power value of the first working coil 132 may be P1. In this example, a resonance frequency of the first working coil 132 may be 20 kHz.

The user may also place a container (or object) in the second heating zone 14 and input a heating initiation instruction. A second required power value of the second working coil 142, corresponding to a power level of the second heating zone 14 set by the user, may be P2, and a driving frequency corresponding to the second required power value P2 may be 22 kHz. The controller 2 may then set a second driving frequency of the second working coil 142 to 22 kHz and supply a control signal to the second driving circuit 24. Accordingly, the second working coil 142 may show the same resonance characteristic as that of the curve 68. The second working coil 142 may be driven at the driving frequency of 22 kHz, and an output power value of the second working coil 142 may be P2. In this example, a resonance frequency of the second working coil 142 may be 22 kHz. That is, in the example embodiment of FIG. 13, the resonance frequency of the first working coil 132 and the resonance frequency of the second working coil 142 may be the same.

While the containers are being heated as a result of driving of each of the first working coil 132 and the second working coil 142, the user may decrease the power level of the first heating zone 12. As the power level of the first heating zone 12 decreases, the required power value of the first working coil 132 may decrease from P1 to P3.

The controller 2 may determine a third driving frequency corresponding to a third required power value P3 that is a new required power value of the working coil (i.e., the first working coil 132 in which the required power value is changed). As shown in FIG. 11, the third frequency corresponding to the third required power value P3 may be 30 kHz.

The controller 2 may calculate a difference value between the third driving frequency of the working coil (the required power value of which is changed) and the driving frequency (the second driving frequency) of the working coil (the second working coil 142) in which the required power value is not changed. In the embodiment of FIG. 11, the difference value between the third driving frequency (30 kHz) and the second driving frequency (22 kHz) may be 8.

The controller 2 may confirm whether the calculated difference value (8) is included in a predetermined first reference range (e.g., a range from 5 kHz to 20 kHz). Since the calculated difference value (8) is included in the first reference range, the controller 2 may change the operation mode of the first inverter circuit 204 to the frequency doubler mode. Accordingly, switching signals S1, S2, S3, S4 having waveforms illustrated in FIG. 5 may be respectively input to the first inverter circuit 204.

When the first inverter circuit 204 is driven in the frequency doubler mode, a resonance frequency of the first working coil 132 may become twice an existing resonance frequency. Thus, the first working coil 132 may show a resonance characteristic that is new and the same as the resonance characteristic of the curve 69 illustrated in FIG. 14, and the resonance frequency of the first working coil 132 may be changed to 40 kHz. Additionally, the third driving frequency corresponding to the third required power value P3 of the first working coil 132 may be changed to 52 kHz.

When the third driving frequency of the first working coil 132 is changed as a result of change in the operation mode of the first inverter circuit 204, a difference value (29) between the third driving frequency (52 kHz) of the first working coil 132 and the second driving frequency (23 kHz) of the second working coil 142 is out of a second reference range. Accordingly, the controller 2 may drive the first working coil 132 at the third driving frequency (52 kHz) and drive the second working coil 142 at the second driving frequency (23 kHz). As a result, interference noise caused by the driving of the first working coil 132 and the second working coil 142 may be prevented although the output power value of the first working coil 132 is changed from P1 to P3.

When the required power value of the first working coil 132 is changed after the change in the operation mode of the first inverter circuit 204 to the frequency doubler mode as illustrated in FIG. 14, the controller 2 may change the power control mode of the first inverter circuit 204 to the asymmetric pulse width modulation mode. However, in another example embodiment, the controller 2 may change the diving frequency of the first working coil 132 to change the output power value of the first working coil 132 even after the operation mode of the first inverter circuit 204 is changed to the frequency doubler mode and the required power value of the first working coil 132 is changed as illustrated in FIG. 10.

Figure 15:
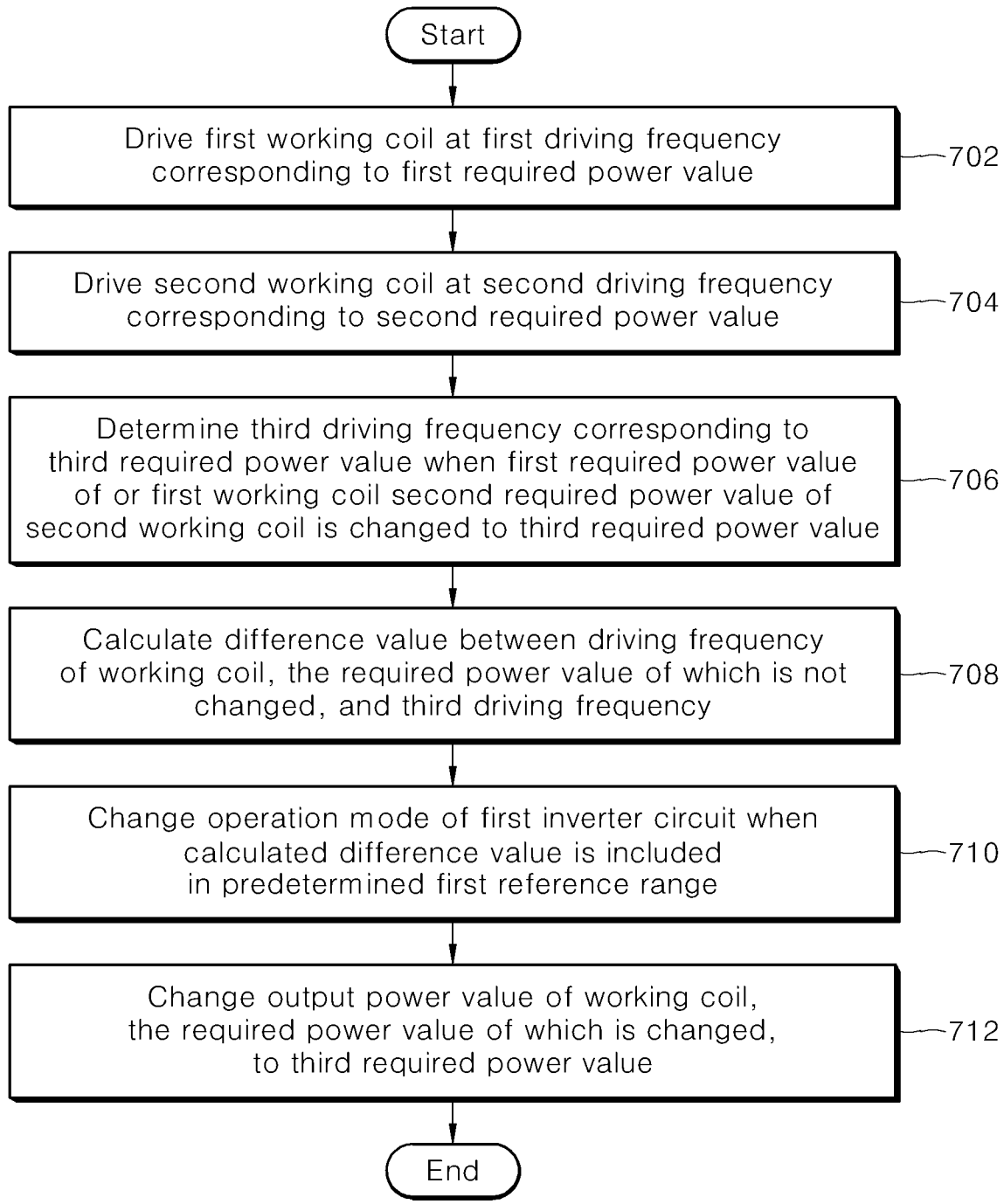
FIG. 15 is a flow chart showing a method for controlling an induction heating apparatus according to one embodiment.

FIG. 15 is a flow chart showing a method for controlling an induction heating apparatus according to one example embodiment. Other embodiments and configurations may also be provided.

The controller 2 of the induction heating apparatus 10 may drive the first working coil 132 at a first driving frequency corresponding to a first required power value set by a user (702). Additionally, the controller 2 may drive the second working coil 142 at a second driving frequency corresponding to a second required power value set by the user (704).

When the user changes the required power value of the first working coil 132 or the second working coil 142 to a third required power value in the state in which the first working coil 132 and the second working coil 142 are being driven, the controller 2 may determine a third driving frequency corresponding to the third required power value (706).

The controller 2 may calculate a difference value between the driving frequency of the working coil (the required power value of which is not changed) and the third driving frequency (708).

The controller 2 may change an operation mode of the first inverter circuit 204 configured to supply the first working coil 132 with current when the calculated difference value is included in a predetermined first reference range (710). In one example embodiment, changing the operation mode of the first inverter circuit 204 (710) may include changing the operation mode of the first inverter circuit 204 to a frequency doubler mode when the difference value calculated in operation 708 is included in the first reference range.

When the operation mode of the first inverter circuit 204 is changed, a resonance frequency of the first working coil 132 may be amplified. Additionally, when the operation mode of the first inverter circuit 204 is changed, the difference value between the driving frequency of the working coil (the required power value of which is not changed) and the third driving frequency may be a noise avoidance value or greater in an entire power range of the first working coil 132 and an entire power range of the second working coil 142.

The controller 2 may change an output power value of the working coil (the required power value of which is changed) to the third required power value (712). When the output power value of the working coil the required power value of which is changed to the third required power value, the difference value between the driving frequency of the working coil (the required power value of which is changed) and the driving frequency of the working coil (the required power value of which is not changed) may be out of a second reference range, thereby preventing generation of interference noise.

The method for controlling an induction heating apparatus according to one example embodiment may further include changing a power control mode of the first working coil 132 to an asymmetric pulse width modulation mode when the required power value of the first working coil 132 is changed after the change in the operation mode of the first inverter circuit 204.

Embodiments of the present disclosure may be directed to an induction heating apparatus and a method for controlling the same that may prevent interference noise caused by driving of two working coils while maintaining output power values and required power values of the working coils at the same value when the working coils are driven at the same time.

Embodiments of the present disclosure may be also directed to an induction heating apparatus and a method for controlling the same that may prevent interference noise caused by driving of working coils when various types of containers having different properties are heated.

An induction heating apparatus according to one example embodiment may include a first working coil and a second working coil. The first working coil may be driven at a first driving frequency corresponding to a first required power value set by a user, and the second working coil may be driven at a second driving frequency corresponding to a second required power value set by the user.

When the user changes the required power value of the first working coil or the second working coil to a third required power value, a controller may determine a third driving frequency corresponding to the third required power value. For example, when the user changes the required power value of the second working coil to the third required power value, the driving frequency of the second working coil needs to be changed to the third driving frequency.

However, when the second working coil is driven at the third driving frequency, interference noise may be caused by the first working coil and the second working coil. To prevent this from happening, the controller may calculate a difference value between the driving frequency of the working coil (e.g., the first working coil), the required power value of which is not changed, and the third driving frequency, and may compare the calculated difference value with a predetermined first reference range (e.g., a range from 5 kHz to 20 kHz).

When the calculated difference value is included in the first reference range, it means that interference noise is caused by the first working coil and the second working coil. To prevent the interference noise, the controller may change an operation mode of a first inverter circuit from a full bridge mode to a frequency doubler mode.

When the operation mode of the first inverter circuit is changed to the frequency doubler mode, a resonance frequency of the first working coil may be amplified to a twice a resonance frequency of the first working coil in the full bridge mode. As the driving frequency of the first working coil becomes higher, the difference value between the driving frequency of the first working coil and the driving frequency of the second working coil may be greater than a boundary value (e.g., 20 kHz) of an audible frequency band. As a result of control above, the interference noise caused by the driving of the two working coils may be prevented.

An induction heating apparatus according to one example embodiment may include a first working coil, a first inverter circuit driven at a first driving frequency corresponding to a first required power value of the first working coil and configured to supply the first working coil with current, a second working coil, a second inverter circuit driven at a second driving frequency corresponding to a second required power value of the second working coil and configured to supply the second working coil with current, and a controller configured to determine a third driving frequency corresponding to a third required power value when the required power value of the first working coil or the second working coil is changed to the third required power value, to calculate a difference value between the driving frequency of the working coil, the required power value of which is not changed, and the third driving frequency, to change an operation mode of the first inverter circuit when the difference value is included in a predetermined first reference range, and to change an output power value of the working coil, the required power value of which is changed, to the third required power value.

When the difference value is included in the predetermined first reference range, the controller may change the operation mode of the first inverter circuit to a frequency doubler mode.

The first inverter circuit may include a variable capacitor part and a relay part connected to the variable capacitor part, wherein the controller sets a capacitance value of the variable capacitor part to Cr,d of an equation below (Equation 1) by opening or closing a plurality of relays included in the relay part.

$$C_{r,d} = \frac{1}{(2\pi f_{r,d})^2 L_r} \quad \text{[Equation 1]}$$

(Herein, fr,d may be a twice a frequency of a switching signal input to the first inverter circuit, and Lr may be an inductance value of a second inductor included in the first inverter circuit.)

When the operation mode of the first inverter circuit is changed, a resonance frequency of the first working coil may be amplified.

When the operation mode of the first inverter circuit is changed, the difference value between the driving frequency of the working coil, the required power value of which is not changed, and the third driving frequency may be a noise avoidance value or greater in an entire power range of the first working coil and an entire power range of the second working coil.

The first inverter circuit may be a full bridge circuit, and the second inverter circuit may be a half bridge circuit or a full bridge circuit.

When the required power value of the first working coil is changed after the change in the operation mode of the first inverter circuit, the controller may change a power control mode of the first working coil to an asymmetric pulse width modulation mode.

A method for controlling an induction heating apparatus according to one example embodiment may include driving a first working coil at a first driving frequency corresponding to a first required power value, driving a second working coil at a second driving frequency corresponding to a second required power value, determining a third driving frequency corresponding to a third required power value when the required power value of the first working coil or the second working coil is changed to the third required power value, calculating a difference value between the driving frequency of the working coil, the required power value of which is not changed, and the third driving frequency, changing an operation mode a first inverter circuit configured to supply the first working coil with current when the difference value is included in a predetermined first reference range, and changing an output power value of the working coil, the required power value of which is changed, to the third required power value.

Changing an operation mode, a first inverter circuit may include changing the operation mode of the first inverter circuit to a frequency doubler mode when the difference value is included in the predetermined first reference range.

The first inverter circuit may include a variable capacitor part and a relay part connected to the variable capacitor part, wherein when the operation mode of the first inverter circuit is changed to the frequency doubler mode, a capacitance value of the variable capacitor part may be set to Cr,d of an equation below (Equation 1) as a result of opening or closing of a plurality of relays included in the relay part.

$$C_{r,d} = \frac{1}{(2\pi f_{r,d})^2 L_r} \quad \text{[Equation 1]}$$

(Herein, fr,d may be a twice a frequency of a switching signal input to the first inverter circuit, and Lr may be an inductance value of a second inductor included in the first inverter circuit.)

When the operation mode of the first inverter circuit is changed, a resonance frequency of the first working coil may be amplified.

When the operation mode of the first inverter circuit is changed, the difference value between the driving frequency of the working coil, the required power value of which is not changed, and the third driving frequency may be a noise avoidance value or greater in an entire power range of the first working coil and an entire power range of the second working coil.

The first inverter circuit may be a full bridge circuit, and the second inverter circuit configured to supply the second working coil with current may be a half bridge circuit or a full bridge circuit.

The method for controlling an induction heating apparatus according to one example embodiment may further include changing a power control mode of the first working coil to an asymmetric pulse width modulation mode when the required power value of the first working coil is changed after the change in the operation mode of the first inverter circuit.

An induction heating apparatus according to the present disclosure may prevent interference noise caused by driving of two working coils while maintaining output power values and required power values of the working coils at the same value when the working coils are driven at the same time.

The induction heating apparatus according to the present disclosure may prevent interference noise caused by driving of working coils when various types of containers having different properties are heated.

The embodiments are described above with reference to a number of illustrative embodiments thereof. However, the present disclosure is not intended to limit the embodiments and drawings set forth herein, and numerous other modifications and embodiments can be devised by one skilled in the art without departing from the technical spirit of the disclosure. Further, the effects and predictable effects based on the configurations in the disclosure are to be included within the range of the disclosure though not explicitly described in the description of the embodiments.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An induction heating apparatus, comprising:
   a first working coil;
   a first inverter circuit to provide current to the first working coil at a first driving frequency corresponding to a first power value of the first working coil;
   a second working coil;
   a second inverter circuit to provide current to the second working coil at a second driving frequency corresponding to a second power value of the second working coil; and
   a controller configured to:
      determine a third driving frequency corresponding to a third power value when the power value of the first working coil is changed to the third power value,
      determine a difference value between the third driving frequency of the first working coil and the second driving frequency of the second working coil,
      change an operation mode of the first inverter circuit to a frequency doubler mode when the determined difference value is within a predetermined range, and
      change an output power value of the first working coil to the third power value.

2. The induction heating apparatus of claim 1, wherein when the determined difference value is within the predetermined range, the controller is to change the operation mode of the first inverter circuit to a frequency doubler mode.

3. The induction heating apparatus of claim 2, wherein the first inverter circuit comprises:
   a variable capacitor circuit; and
   a relay circuit connected to the variable capacitor circuit, wherein the controller is configured to set a capacitance value of the variable capacitor circuit to $C_{r,d}$ of the following Equation 1 by opening or closing a plurality of relays included in the relay circuit, $$C_{r,d} = \frac{1}{(2\pi f_{r,d})^2 L_r} \quad \text{[Equation 1]}$$

wherein $f_{r,d}$ is twice a frequency of a switching signal input to the first inverter circuit, and $L_r$ is an inductance value of an inductor included in the first inverter circuit.

4. The induction heating apparatus of claim 1, wherein a resonance frequency of the first working coil is amplified when the operation mode of the first inverter circuit is changed.

5. The induction heating apparatus of claim 1, wherein when the operation mode of the first inverter circuit is changed, the determined difference value between the driving frequency of the first working coil and the second driving frequency is a noise avoidance value or greater in an entire power range of the first working coil and an entire power range of the second working coil.

6. The induction heating apparatus of claim 1, wherein the first inverter circuit is a full bridge circuit, and the second inverter circuit is a half bridge circuit or a full bridge circuit.

7. The induction heating apparatus of claim 1, wherein when the power value of the first working coil is changed after the change in the operation mode of the first inverter circuit, the controller is to change a power control mode of the first working coil to an asymmetric pulse width modulation mode.

8. A method for controlling an induction heating apparatus, comprising:
    driving a first working coil at a first driving frequency corresponding to a first power value;
    driving a second working coil at a second driving frequency corresponding to a second power value;
    determining a third driving frequency corresponding to a third power value when the power value of the first working coil is changed to the third power value;
    determining a difference value between the third driving frequency of the first working coil and the second driving frequency of the second working coil;
    changing an operation mode of a first inverter circuit configured to supply the first working coil with current when the determined difference value is within a predetermined range; and
    changing an output power value of the first working coil to the third power value,
    wherein the changing of the operation mode of the first inverter circuit comprises changing the operation mode of the first inverter circuit to a frequency doubler mode when the determined difference value is within the predetermined range.

9. The method of claim 8, wherein the first inverter circuit comprises:
    a variable capacitor circuit; and
    a relay circuit connected to the variable capacitor circuit, wherein when the operation mode of the first inverter circuit is changed to the frequency doubler mode, a capacitance value of the variable capacitor circuit is set to Cr,d of the following Equation as a result of opening or closing of a plurality of relays included in the relay circuit, $$C_{r,d} = \frac{1}{(2\pi f_{r,d})^2 L_r} \quad \text{[Equation 1]}$$

wherein fr,d is twice a frequency of a switching signal input to the first inverter circuit, and Lr is an inductance value of an inductor included in the first inverter circuit.

10. The method of claim 8, comprising amplifying a resonance frequency of the first working coil when the operation mode of the first inverter circuit is changed.

11. The method of claim 8, wherein when the operation mode of the first inverter circuit is changed, the determined difference value between the third driving frequency of the first working coil and the second driving frequency of the second working coil is a noise avoidance value or greater in an entire power range of the first working coil and an entire power range of the second working coil.

12. The method of claim 8, wherein the first inverter circuit is a full bridge circuit, and the second inverter circuit is a half bridge circuit or a full bridge circuit.

13. The method of claim 8, comprising changing a power control mode of the first working coil to an asymmetric pulse width modulation mode when the power value of the first working coil is changed after the change in the operation mode of the first inverter circuit.

14. A method of an induction heating apparatus, comprising:
    controlling a first inverter circuit to drive a first working coil at a first driving frequency;
    controlling a second inverter circuit to drive a second working coil at a second driving frequency;
    in response to a change of a power level of the first working coil, determining a third driving frequency;
    determining a difference between the third driving frequency and the second driving frequency;
    changing an operation mode of a first inverter circuit based on the determined difference; and
    changing an output of the first working coil based on the changed operation mode,
    wherein changing the operation mode of the first inverter circuit comprises changing the operation mode of the first inverter circuit to a frequency doubler mode.

15. The method of claim 14, comprises amplifying a resonance frequency of the first working coil when the operation mode of the first inverter circuit is changed.

16. The method of claim 14, wherein when the operation mode of the first inverter circuit is changed, the determined difference value between the third driving frequency of the first working coil and the second driving frequency of the second working coil is a noise avoidance value or greater in an entire power range of the first working coil and an entire power range of the second working coil.

17. The method of claim 14, comprising changing a power control mode of the first working coil to an asymmetric pulse width modulation mode when the output of the first working coil is changed after the change in the operation mode of the first inverter circuit.

18. The method of claim 14, wherein determining the difference between the third driving frequency and the second driving frequency includes determining whether the difference is within a predetermined range.

* * * * *